United States Patent [19]

Ho

[11] Patent Number: 5,588,023
[45] Date of Patent: Dec. 24, 1996

[54] HIGH CONTENT INFORMATION TRANSMISSION SYSTEM

[76] Inventor: Kit-Fun Ho, P.O. Box 54504, North Point, Hong Kong

[21] Appl. No.: 423,126

[22] Filed: Apr. 18, 1995

Related U.S. Application Data

[63] Continuation of Ser. No. 268,797, Nov. 8, 1988, abandoned, which is a continuation-in-part of Ser. No. 853,480, Apr. 18, 1986, Pat. No. 4,809,299.

[51] Int. Cl.$^6$ .............................. H03K 7/08; H03K 9/08
[52] U.S. Cl. .................. 375/238; 375/259; 341/53
[58] Field of Search .................... 375/238, 307, 375/295, 316, 275, 303, 239, 334, 335, 276, 259, 253; 340/825.48, 825.64, 825.54, 825.73, 825.63; 455/37; 329/312; 332/109; 327/31; 328/111; 341/53, 67, 65; 370/9

[56] References Cited

U.S. PATENT DOCUMENTS

| | | | |
|---|---|---|---|
| 3,510,780 | 5/1970 | Buehrle | 375/22 |
| 3,566,033 | 2/1971 | Young | 375/49 |
| 3,867,700 | 2/1975 | Wycoff | 340/825.73 X |
| 4,066,841 | 1/1978 | Young | 375/276 |
| 4,188,581 | 2/1980 | Stevenson | 375/22 |
| 4,430,652 | 2/1984 | Rothenbuhler et al. | 375/23 X |
| 4,695,840 | 9/1987 | Darilek | 340/825.54 |
| 4,771,440 | 9/1988 | Fromm | 375/22 |
| 4,809,299 | 2/1989 | Ho | 375/48 |

*Primary Examiner*—Tesfaldet Bocure

[57] ABSTRACT

The system is used for tranmsitting information comprising message units each having multi-bit equivalent information content wherein each possible message unit in a set, (e.g. the alpha-numeric sybmol set, or other digital data) is defined by a specific half-cycle duration and messages are transmitted by conversion to half-cycle wavelet signals at the specific half-cycle durations at one message unit per half-cycle wavelet. The half-cycle wavelets are transmitted as a series of alternating half-cycle signals. The half-cycle signals are received by a receiver which measures the half-cycle duration, matches it with the pre-defined half-cycle duration and outputs that message unit. A computer program can be utilized for automatically encoding or decoding. The system has the advantages that it is relatively simple and immune to noise, it demands fewer waveform switching and affords a transmission rate of muti-bits per half-cycle wavelet. The system has advantageous compatible resolution properties. In particular, the system is operable to transmit information by converting several binary bits to a half-cycle wavelet for transmission.

20 Claims, 8 Drawing Sheets

"HALF-CYCLE" WAVELETS

"HALF-CYCLE" WAVELETS

"HALF-CYCLE" WAVELETS

FIG. 4  MESSAGE—DURATION CODING TABLE (MD TABLE)

HIGH CONTENT INFORMATION TRANSMISSION SYSTEM

CROSS-REFERENCE TO RELATED APPLICATION

This application is a continuation of Ser. No. 07/268,797, filed Nov. 8, 1988 now abandoned which is related to and is a continuation in part of U.S. patent application Ser. No. 853,480 filed Apr. 18, 1986 now U.S. Pat. No. 4,809,299 issued on Feb. 2, 1989.

BACKGROUND OF THE INVENTION

1. Field of the Invention

The present invention related to the transmission of information and is especially concerned with transmission of message units having high information content.

2. Description of the Prior Art

Numerous systems for the transmission of information have been proposed. For example the prior art provides numerous transmission systems such as those operating on a combined multiamplitude/multiphase signaling scheme like QAM which transmits multi-symbols having multi-bit equivalent information contents. However, such systems are often complicated and in practice transmission errors may be caused by noise, phase jitter and timing problems which sets a limit to the number of QAM states in a QAM constellation for a practical system. See, for example, p. 231 of the book entitled "*INFORMATION TRASMISSION, MODULATION, AND NOISE*", by Mischa Schwartz, published by McGraw-Hill, Inc.

SUMMARY OF THE INVENTION

The present invention is directed to a system for transmitting information wherein the information consists of series of specific message units of high information content out of a set of possible units, (e.g. a word message made out of the 26 of letters of the alphabet, or other digital data) and includes the step of defining a half-cycle duration for each member of the set. Then the message is converted into a series of alternating half-cycle wavelets each having a half-cycle duration so defined. Next this message is transmitted. This set of half-cycle wavelets can then be translated back to the message by a receiver that measures and then deconverts the half-cycle durations of the recieved wavelets.

The system may be readily adapted to be machine implemented using a digital computer and encompasses a transmitter and a receiver for carrying out the process.

Since a half-cycle duration is used, the message can be sent and recognized with half-cycle wavelets of a variety of shapes. The system has the following advantages:

The message unit to half-cycle druation coding in the system enables the system to transmit information at a rate equivalent to several bits per half-cycle wavelet.

The message unit to half-cycle druation coding in the system provides compatibible properties for digital transmissions.

The message unit to half-cycle druation coding in the system provides an upgradable waveform, thereby affording compatibility between high content and low content message units.

The message unit to half-cycle druation coding in the system affords compatibility between systems of high and low digital resolutions.

The message unit to half-cycle druation coding in the system provides a waveform for transmitting degradable digital data.

The system achieves faster than bit-by-bit transmission of information.

The system possesses high noise immunity.

The system achieves fewer waveform switching than bit-by-bit transmission of information, thereby requires lower frequency response, demands less bandwidth, and is less noisy and produces less radio interference.

The system permits multi-symbol transmission using only a two-level waveform.

The system transmits bit patterns each of which comprising a plurality of bits, using only a half-cycle wavelet.

The system provides transmission error checking means in the form of half-cycle wavelets.

Since the system identifies messsage units accord to the duration of a half-cycle wavelet the system has the further advantage of being relatively simple.

The system, together with the advantages thereof, may best be understood by reference to the following description taken in connection with the accompanying drawings, in the several figures of which, like reference numerals indentify like elements.

DESCRIPTION OF THE PREFERRED EMBODIMENT

Figure 1:
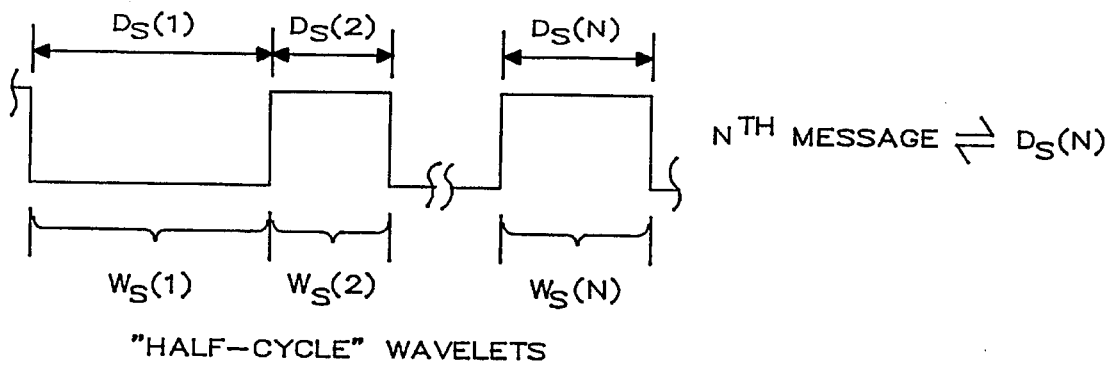
FIG. 1 is a waveform useful in explaining the system of the present invention.

Referring to the drawings and especially to FIG. 1, the process of the present invention may be appreciated from the following description with reference to FIG. 1.

It should be noted that while alternating square waveforms are depicted in the drawings, the invention applies to various alternating waveforms.

The present invention conveys a piece of high content information having an information content equivalent to a plurality of bits with a wavelet, here described as a half-cycle wavelet, such as illustrated by any one of wavelets WS(1), WS(2), and WS(N) of FIG. 1. Furthermore, the present system conveys a series of such high content information by transmitting a series of such half-cycle wavelets, of alternating wavelet polarities, at one piece of high content information per half-cycle wavelet. The system or process of the present invention uses the duration of a half-cycle wavelet, such as wavelet WS(1) of FIG. 1 to identify a specific message or item of high content information (e.g. the letter "A") out of a large number (e.g. 256) of such messages each of which having multi-bit equivalent information content. Of course, the invention may be practised in various manners to convey various forms of information. For example, the specific message or item of information is not limited to letters of the alphabet, but may have other forms, such as the number "138", or the bit pattern "11011011", or other forms of information. In this invention, the duration of a half-cycle wavelet may be generally defined as the time duration between the occurrances of two adjacent, opposite transitions in an alternating waveform wherein the end of one half-cycle wavelet is also the beginning of a succeeding half-cycle wavelet of the opposite polarity. In one manner of practising this invention alternating square waveforms, for example those shown in FIG. 1, are used and the half-wave (i.e. half-cycle wavelet) duration is therefore defined as the time duration, DS, between the occurrances of two adjacent opposite transitions in the waveform, wherein a waveform transition that marks the end of one half-cycle wavelet also marks the beginning of a succeeding wavelet.

Each half-wave duration in a large number or table of half-wave durations is assigned a specific high information content message. With reference to FIG. 1, then, the half-cycle wavelet WS(1) would define a half-wave duration DS(1).

Taking the general case, any half-cycle wavelet WS(N) would define a half-wave duration:

DS(N)

and by defining a message unit, Nth message, the half-cycle wavelet WS(N) yields this Nth message unit M(N). If the value of DS(N) equals Dk in the table, which has been assigned a specific message member Mk, then M(N) equals Mk.

Figure 4:
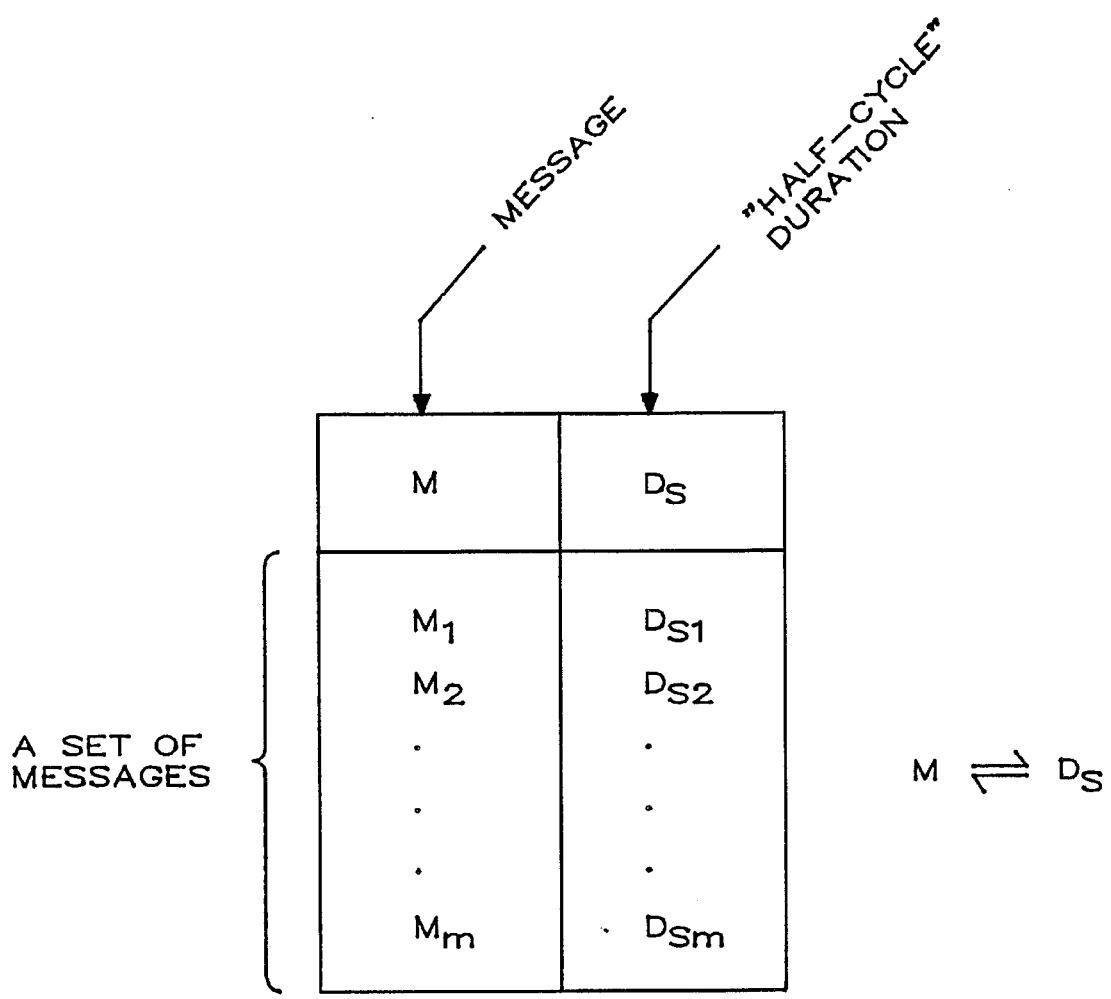
FIG. 4 is a table for use with the system of the present invention.

FIG. 4 is one such generalized table. As a concrete example, let us assume we wish to transmit a message using the English alphabet. We would then make up a table such as this:

TABLE I

| MESSAGE UNITS | HALF-WAVE DURATIONS (microseconds) |
| --- | --- |
| A | 3000 |
| B | 2915 |

TABLE I-continued

| MESSAGE UNITS | HALF-WAVE DURATIONS (microseconds) |
| --- | --- |
| C | 2832 |
| D | 2751 |
| E | 2673 |
| F | 2597 |
| G | 2523 |
| H | 2451 |
| I | 2381 |
| J | 2313 |
| K | 2247 |
| L | 2183 |
| M | 2121 |
| N | 2061 |
| O | 2002 |
| P | 1945 |
| Q | 1890 |
| R | 1836 |
| S | 1784 |
| T | 1733 |
| U | 1684 |
| V | 1636 |
| W | 1589 |
| X | 1544 |
| Y | 1500 |
| Z | 1457 |
| Space | 1426 |
|  | etc. |

As an example for a specific embodiment, the set of half-wave durations in TABLE I has been calculated with incremental step ratios of $2^{(-1/24)}$.

Of course, it is understood that we may adopt other specific sets of half-cycle durations, for example, half-cycle durations in different step ratios or half-cycle durations in equal duration increments in various embodiments.

Thus, referring to TABLE I, a message unit for "Y" could be translated from a half-cycle wavelet WS wherein its duration was 1500 microseconds.

(Of course, in a practical receiver of this system any half-wave duration within a range about the above precise values would be accepted as being that half-wave duration.)

Figure 2:
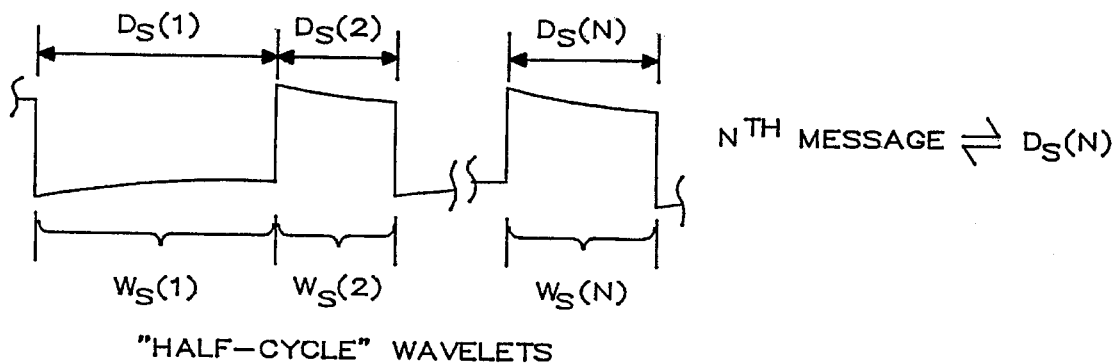
FIG. 2 is another waveform useful in explaining the system the present invention.
Figure 3:
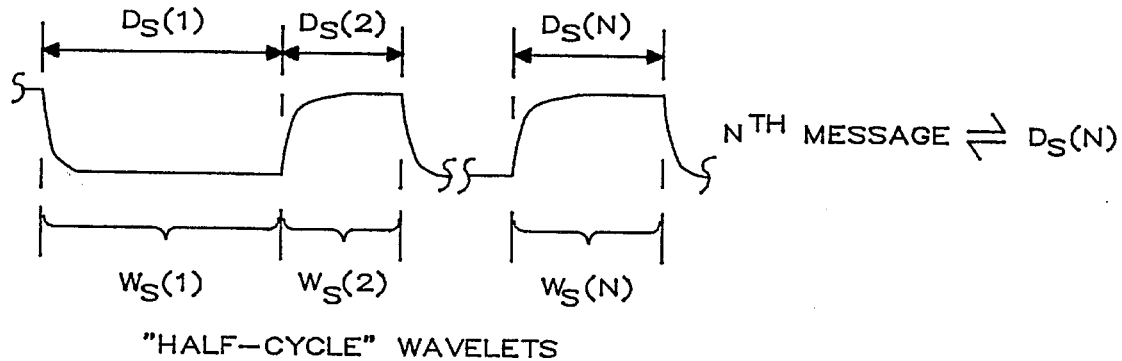
FIG. 3 is yet another waveform useful in explaining the system of the present invention.

The wavelets WS(1), WS(2), etc. can be transmitted squentially, in the form of alternating wavelets such as shown in FIG. 1. Again, in this case each message unit is represented by the half-wave duration defined by message versus half-wave duration coding (MD coding) there set out. And, in the same manner the present invention applies to variously shaped alternating waveforms. The waveforms of FIGS. 1–3 depict several such waveforms.

Furthermore, we may increase the information content of the message unit of a system in the following manner. Referring to the generalized table of FIG. 4, the information content of each message unit is 1 out of m if there are m members in the set of message units. Hence, we may increase the information content of each message unit of the system by establishing more message unit to half-cycle duration correspondences in the set, i.e. by including more members in the set, whereby m is greater. This is further explained as follows. Say, if m of the table is 16 and 256 in two respective embodiments (i.e. having 16 and 256 members of message units, respectively), then the information content of each message unit of the two embodiments is 1 out of 16, and 1 out of 256 (equivalent to 4 and 8 binary bits), respectively, the information content of each message unit of the latter embodiment being greater than that of the former. Of course, it is understood that 8-bit equivalent information content is not a limit. And we may choose to establish a set of more than 256 message units in other embodiments, so that the information content of a transmitted message unit would be greater than 8 bits.

Practising the system or process for information transmission with the wavelets as described above achieves several further advantages as explained below, especially with square wavelets.

As mentioned above, the square wavelets as shown in FIG. 1 provide a concrete example wherein the half-cycle wavelets are alternating and each wavelet consists of either a "mark" or a "space" wavelet. That is, each message unit is represented by a wavelet at a "mark" or "space" amplitude level. Consequently, the transmitted waveform is a 2-logic-state alternating waveform, i.e. a 2-level waveform consisting of the "mark" level and the "space" level, wherein each "mark" duration or "space" duration identifies a message unit in accordance with the message versus half-wave duration coding described above, such as TABLE I. In spite of the fact that the square wavelets have only two logic states or levels, namely, "mark" and "space", in the present invention each "mark" or "space" of the transmitted waveform is efficiently used to represent and transmit a message unit having multi-bit equivalent information content. This is possible because, in accordance with TABLE I, or FIG. 4 in general, each particular "mark" or "space" wavelet has a specific duration which is assigned to one specific message unit out of a set of a large number of message units. In this way the system or process achieves the noise immunity of a signal having a peak-to-peak (amplitude) swing, like that of an "on-off" signal which is often used for binary bit-by-bit signalling. And, yet, it transmits muti-bit equivalent message units, for example like message units transmitted with multi (amplitude) level pulses, but which pulse signals have lower noise immunity because there the possible peak-to-peak amplitude swing has to be divided into several (amplitude) steps. In other words the system or process achieves multi-bit equivalent transmission per wavelet while possessing noise immunity like that of a 2-level (binary) waveform.

Also, by transmitting information with the wavelets FIG. 1 and the message to half-cycle duration assignments of FIG. 4, the present invention provides a compact, and efficient waveform for information transmission (e.g. fast transmission) wherein only one waveform transition is required to transmit a message unit having muti-bit equivalent information content. The waveform is compact and efficient because in this invention each half-cycle wavelet conveys a specific multi-bit equivalent message unit, which contains the same amount of information as several bits, and each waveform transition that marks the end of a preceeding half-cycle wavelet also marks the beginning of a succeeding wavelet, whereby every part of the waveform serves to carry or transmit information, wherein no part of the waveform is wasted for synchronization, start bit, and stop bit, etc. (i.e. no time or any length of the transmitted waveform is wasted). Note that in this manner the system transmits multi-bit equivalent message units whereby it eliminate start bits, stop bits, and other synchronizaton problems associated with bit-by-bit transmission.

Also, by transmitting information with the wavelets FIG. 1 and the message to half-cycle duration assignments of FIG. 4, the present invention significantly reduces the number of switching actions or transitions compared to binary bit-by-bit transmission of the same amount of information, because it requires only one switching action to generate a half-cycle wavelet which conveys a multi-bit equivalent message unit, which may be equivalent to several binary bits, say, 8 or more bits. This advantage of the present invention is further illustrated by one specific concrete example described below wherein the transmitted message units are members of a set of 256 specific message units, and wherein only one switching is required to transmit a message unit having an 8-bit equivalent information content, i.e. 1 byte of information. Hence, the reduction in switching in the embodiment may be as much as down to only ⅛ of the switching in corresponding binary bit-by-bit transmission, depending on the bits combination. Therefore, comparing to binary bit-by-bit transmission at the same information rate the fewer switchings of the system of the present invention requires lower frequency response. Whereas, comparing to binary bit-by-bit transmission at similar switching rate the system of the present invention achieves faster transmission of the same amount of information (i.e. takes shorter time). Hence, the transmission process of the present invention may require much fewer switching actions than corresponding binary bit-by-bit transmission. Furthermore, the invention achieves a system or processs of information transmission which demands less bandwidth than corresponding bit-by-bit transmission. Because the fewer switching actions of the transmission process result in a generated signal waveform having fewer transitions in time, and, hence, occupying less bandwidth. Therefore, the invention achieves an information transmission system which requires less bandwidth in a physical transmission system, including the transmission medium.

Also, by transmitting information as illustrated by the wavelets or FIG. 1 and the message to half-cycle duration assignments of FIG. 4, the present invention achieves a transmission system which produces less frequent electromagnetic disturbance or noise. Since the electrical switching action of a practical transmission system produces electromagnetic radiation, the fewer switching actions achieved by the system and process of the the present invention hence produces less frequent electromagnetic disturbance or radiation, and, hence, less noise or radio interference than corresponding binary bit-by-bit transmission.

The present invention may also be practised to provide a bit pattern transmission system, by taking a pattern of a plurality of binary bits, e.g. a pattern of 8 bits, such as the pattern "10011100" as a specific message unit, which is then converted into and transmitted as a half-cycle wavelet having a specific half-cycle duration, in the same general manner like other forms of message units. Note that message units or information often exist in binary form in computer, data, and communication equipment, for example existing in a pattern of a plurality of bit, such as a pattern of 4 bits representing 1 nibble of information, or a pattern of 8 bits representing 1 byte of information, etc. So, the present bit pattern transmission system readily transmits digital data existing in the form of a pattern of a plurality of bits, such as binary data in computer memory, input/output bus, and digital communication equipment, etc. In this case, the table of FIG. 4 for the transmission system may be a more specific table containing bit patterns as message units. TABLE Ia shows an example table suitable for transmitting 4-bit data patterns, wherein each binary bit pattern is assigned a particular half-cycle duration as follows:

TABLE Ia

| MESSAGE UNITS (bit patterns) | HALF-WAVE DURATIONS (microseconds) |
| --- | --- |
| 0000 | 3000 |
| 0001 | 2915 |

TABLE Ia-continued

| MESSAGE UNITS (bit patterns) | HALF-WAVE DURATIONS (microseconds) |
|---|---|
| 0010 | 2832 |
| 0011 | 2751 |
| . | . |
| . | . |
| 1110 | 2002 |
| 1111 | 1945 |

A further specific example is shown in TABLE Ib suitable for transmitting 8-bit data patterns, wherein 8 bits are converted into and transmitted as a half-cycle wavelet.

TABLE IIb

| MESSAGE UNITS (bit patterns) | HALF-WAVE DURATIONS (microseconds) |
|---|---|
| 00000000 | 2509 |
| 00000001 | 2506 |
| 00000010 | 2503 |
| . | . |
| . | . |
| 11111101 | 1750 |
| 11111110 | 1747 |
| 11111111 | 1744 |

Transmitter

Figure 5:
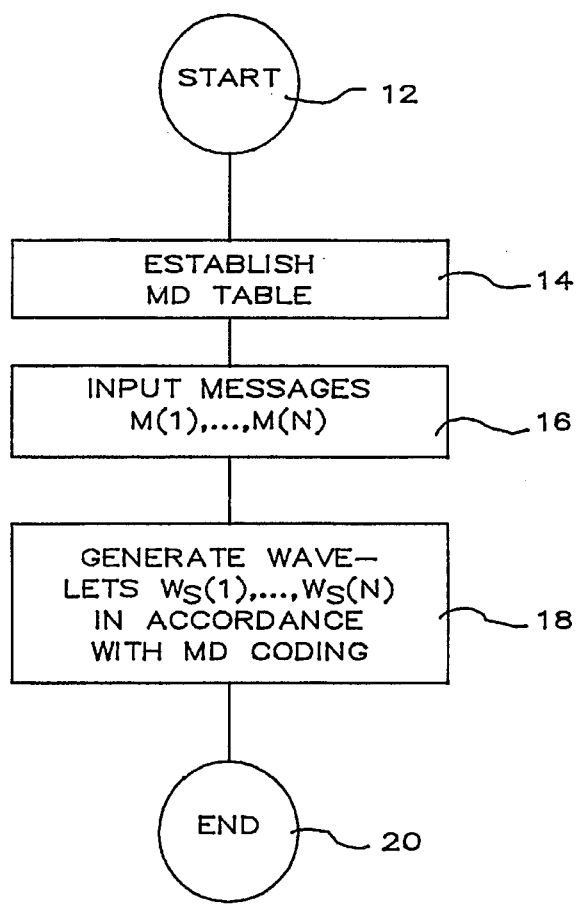
FIG. 5 is a flow chart useful in illustrating the overall operation of the system.

FIG. 5 shows the steps in practicing the process of the present invention in the conventional computer flow chart manner. From a start at 12, the first step 14 is to establish the message duration (MD) Table (step 14). The next step 16 is to input specific message units M(1) ... M(N) (for example, the letters and spaces NOW IS THE TIME ... AID ... using Table I above.) at step 16 and select the corresponding half-wave durations from the MD Table of step 14. The final step 18 is to generate the the wavelets WS(1), WS(2), etc. in accordance with the input of step 16 and when this is done the operation is over at step 20. (Note that the message duration Table serves as a convenient and fast coding means. Although the message duration Table is currently preferred, it is understood that in alternative embodiments the message versus half-cycle duration coding table may be replaced by other forms or message versus duration coding means, such as specific coding rules and in which process the corresponding half-cycle durations may be obtained according to the specific message versus half-cycle duration coding rules there provided.)

Figure 6:
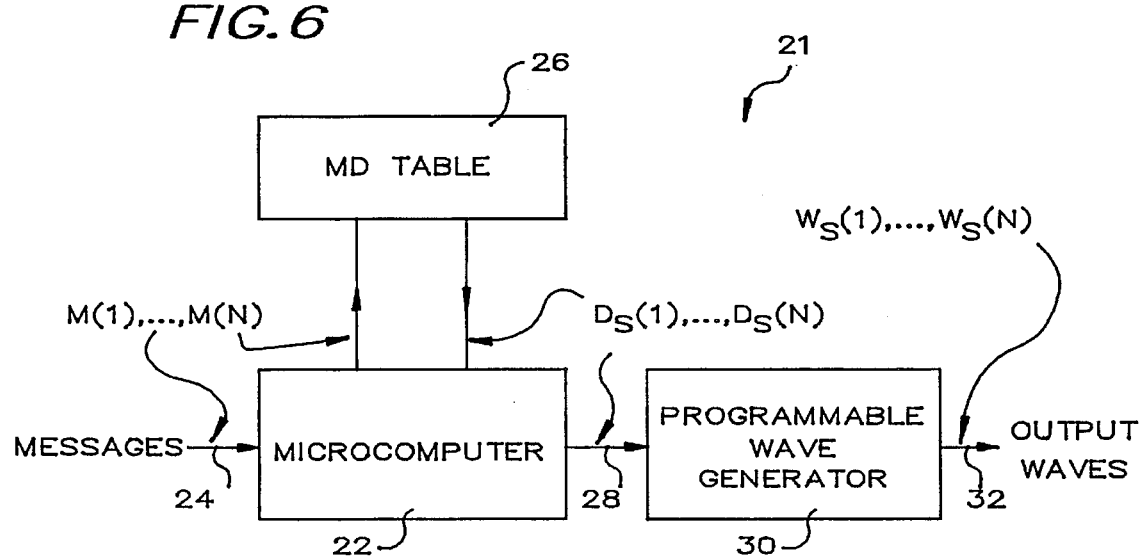
FIG. 6 is a block diagram of a system for producing or transmitting signals, constructed in accordance with the system of the present invention.

A transmitter 21 for carrying out the process or FIG. 5 is shown in FIG. 6 wherein a microcomputer 22 receives the message units (e.g. through a keyboard or I/O port or memory unit, etc.) at input 24 and selects the proper half wave duration from a MD Table unit 26. (This table may take the form of a ROM chip or any other suitable source). The microcomputer 22 derives a succession of signals for message wavelets and supplies them to an output 28. These can be, for example, the duration of half-cycle wavelets, DS(1), DS(2) etc. The output 28 feeds a programmable wave generator 30 which produces the output half-cycle wavelets WS(1), WS(2) etc. on its output 32. This latter output 32 may be fed to a suitable transmission vehicle such as a transmission line or broadcast antenna or optic fiber. (Of course, it is understood that the transmission of the output half-cycle wavelets WS(1), WS(2), etc. may include modulation and subquent demodulation of a carrier signal.)

This transmitter has been constructed and successfully operated using a BBC Microcomputer Model B. This Microcomputer contains a 6502 CPU and two 6522 Versatile Interface Adaptors, where one of which, the USER VIA, is already connected to the Model B's USER PORT for user applications. A more detailed flow chart for this particular and currently preferred method of carrying out the invention is shown in FIG. 7.

In this particular case, the microcomputer 22 may serves as not only the microcomputer 22, but by placing the Table MD in its RAM as the table 26, the USER VIA section can be operated as the generator 30 wherein the output waves are obtained across the standard circuit points identified as PB7 and OV at the USER PORT of this commercially available computer.

Figure 7:
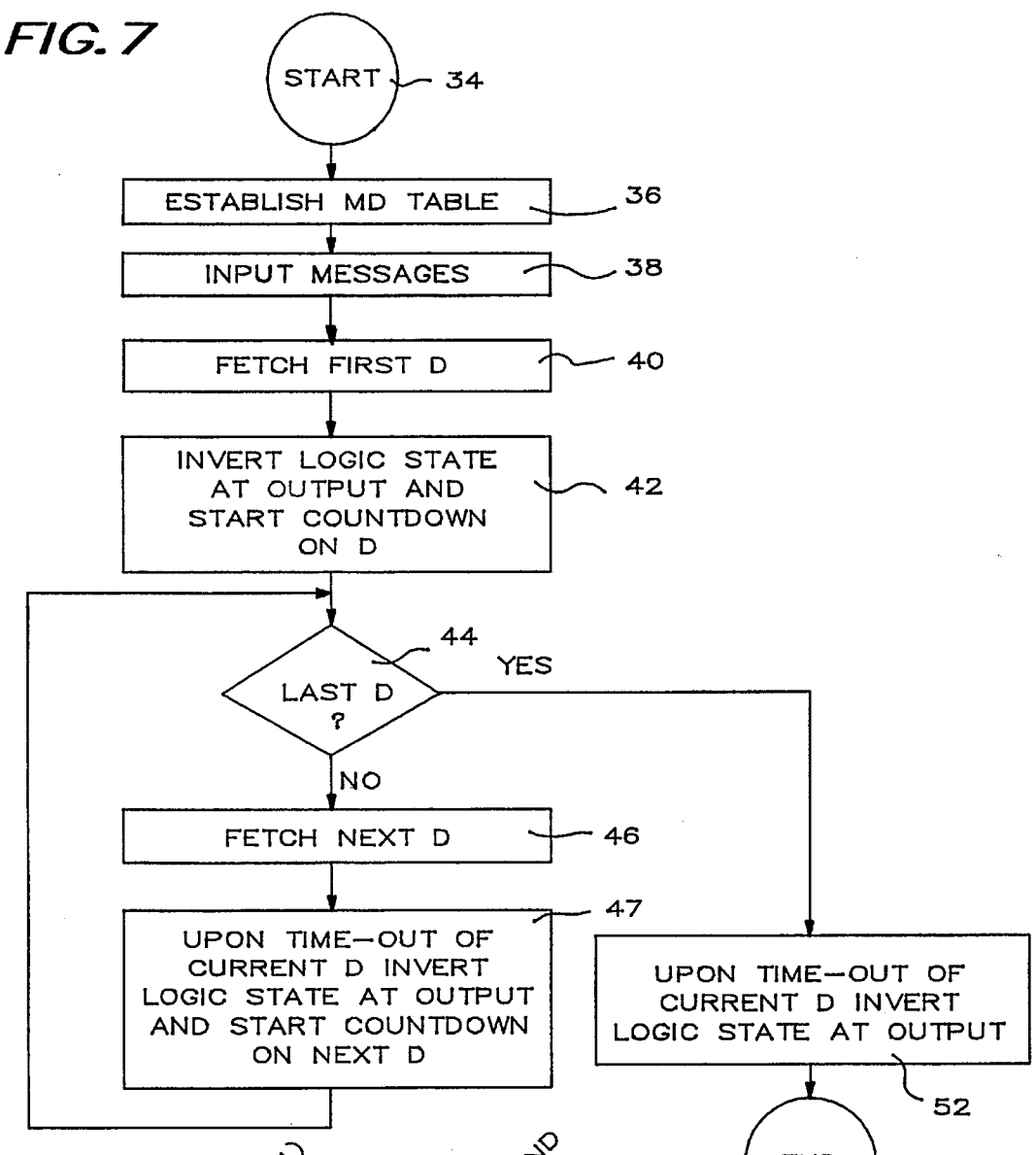
FIG. 7 is a more detailed flow chart useful for illustrating the operation of the system shown in FIG. 6.

The flow chart of FIG. 7 includes a start command 34 which establishes a MD Table at step 36 and accepts input messages at step 38. In response to the first of these input message units at step 38, it fetches the corresponding duration D (half-cycle) at step 40 and in the next stage 42, inverts the logic state at the output and starts a countdown on D. Before the conclusion of this countdown the system tests (test block 44) if the current D is the last D. If this is not the last D the system responds as indicated in block 46 to fetch the next D, and as indicated in block 47 to, upon the time out of the current D, invert the logic state at the output and start the countdown on the next D, and the system restarts the process of testing for the last D. If the answer to test 44 is "yes" the system responds as indicated by block 52 to preceed to await the time out of the countdown on the last D to invert the logic state at the output and proceed to end at 54.

The program for carrying out this operation is as follows:

Transmitter Program I

```
10 REM INVENTED BY HO KIT-FUN
20 REM
40 REM NORTH POINT
50 REM HONG KONG
60 REM
70 REM TX1A (6-29-1988)
80 REM PRESTOB18G
85 REM
90 ?&FE6B=&C0 : REM SET USER 6522 AT FREE-RUNNING MODE
92 ?&FE62=&80 : REM INITIALIZE OUTPUT (SET PB7 AT HIGH)
94 ?&FE6E=&00 : REM INTERRUPT DISABLED
100 REM
110 REM ESTABLISH MESSAGE-HALF WAVE  DURATION CODING TABLE
122 REM SPECIFIC SET OF HALF WAVE DURATIONS, PROGRAMMABLE:
```

| Transmitter Program I |
| --- |
| 124 DATA 3000,2915,2832,2751,2673,2597,2523,2451
125 DATA 2381,2313,2247,2183,2121,2061,2002,1945
126 DATA 1890,1836,1784,1733,1684,1636,1589,1544
127 DATA 1500,1457,1415,1375,1336,1298,1261,1255
130 DELAY%=3
140 DSH%=&0DA0 : DSL%=&0DC0 : REM LOCATION OF MD TABLE
150 FOR M = 0 TO 31 : REM (IN OTHER EMBODIMENTS FOR DATA COMMUNICATION THE MESSAGE MAY BE SIMPLY ANY INTEGER IN THE RANGE 0-31)
170 REM FOR EXAMPLE 32-STATE MESSAGES IN THIS DEMONSTRATION
180 REM (EACH MESSAGE HAS THE SAME INFORMATION CONTENT AS 5 BINARY BITS)
200 READ DS%
230 DS%=DS%-DELAY% : REM DELAY CORRECTION
232 REM TRUE DURATION = PROGRAMMED DURATION + DELAY
235 DSH%?M=DS% DIV 256
238 DSL%?M=DS% MOD 256
240 NEXT M
290 REM INPUT MESSAGES
300 N=128 : REM TAKE N INPUT MESSAGE UNITS (N=1,5,16,64 ETC., PROGRAMMBLE)
320 DTA%=&3000 : ?DTA%=N
330 FOR NUM% = N TO 1 STEP −1
340 M=GET
342 IF M=32 THEN M=27 ELSE M=M−65
350 DTA%?(NUM%)=M
360 NEXT
390 REM USING THE USER VIA
400 REM GENERATE WAVES
410 REM IN ACCORDANCE WITH MD TABLE
420 FOR PASS = 0 TO 3 STEP 3
430 P%=&0D00
440 [
450 OPT PASS
500 LDX DTA%
502 LDA DTA%,X
504 TAY
506 LDA DSL%,Y
508 STA &FE64           \LOAD 16-BIT COUNTER
510 LDA DSH%,Y          \WITH FIRST
512 STA &FE65           \SIGNAL DURATION
514 JMP LAST
550 .LOOP LDA DTA%,X
560 TAY
570 LDA DSL%SY
580 STA &FE66           \LOAD 16-BIT LATCH
590 LDA DSH%,Y          \WITH NEXT
600 STA &FE67           \SIGNAL DURATION
620 .STS BIT &FE6D
630 BVC STS             \WAIT TILL A TIME-OUT
640 .LAST DEX
650 BEQ STP                       \LAST D?
660 JMP LOOP
690 .STP LDA #&80
700 STA &FE6B
710 RTS
720 ]
730 NEXT PASS
740 CALL &0D00
750 PRINT CHR$(7)
770 END |

The flow chart of FIG. 7 and this program consist of the procedure used to realize a machine which conveys high content message units (i.e. information) by producing duration-coded half-cycle wavelets at one message unit per half-cycle wavelet like those shown in FIG. 1.

Figure 8:
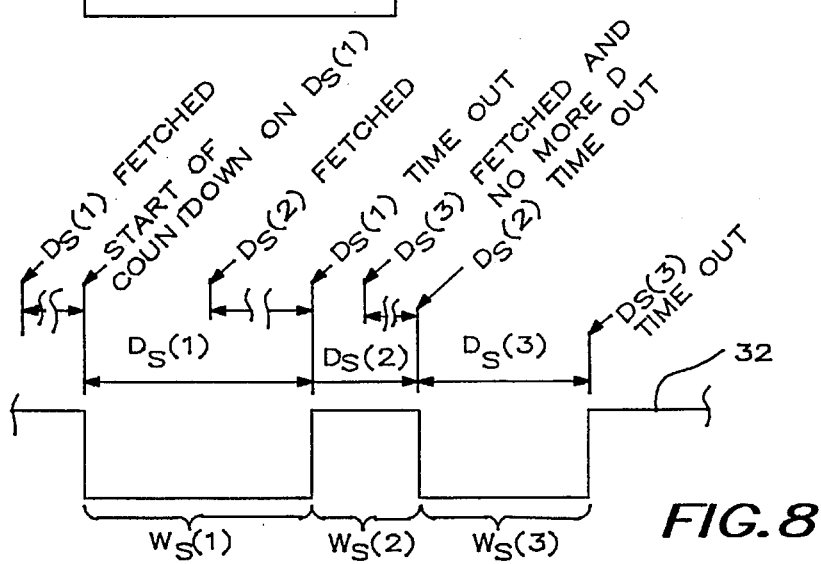
FIG. 8 is a waveform diagram illustrating a feature of the system of the present invention.

The output produced by the system of FIGS. 6 and 7 is like that shown in FIG. 8 wherein the output at line 52 is depicted from the DS(l) and DS(2) and DS(3) with the various logic events depicted in the timed relationship to the output.

Receiver

Figure 9:
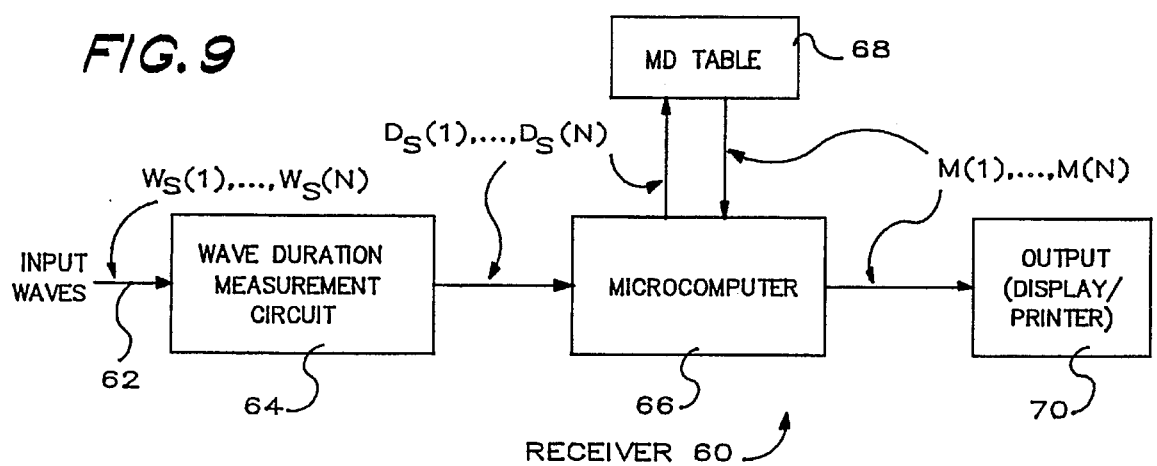
FIG. 9 is a block diagram of a receiver system constructed in accordance with the princilples of the present invention.

Referring to FIG. 9, there is depicted a receiver 60 having an input 62, on which the wavelets WS(1), ..., WS(N) are received from a suitable transmission media such as a transmission line or optic fiber or antenna. This input 62 delivers the waveforms to a wave duration measurement circuit 64 which serves to measure the duration D and feeds a succession of duration information on DS(1), DS(2), etc. to a microcomputer 66. An MD Table 68 which is substantially similar to that of the transmitter sending the signals WS(1), WS(2), etc. is provided and the computer using the duration information derives from the table 68 the message units M(1), ..., M(N). These message units are fed to a suitable output 70 such as a Cathode Ray Tube display or a printer or other peripherals.

The MD Table 26 of the transmitter 21 would be one of precise durations but as stated above the receiver should recognize detected half-cycle wavelet durations within a range of values about the precise values. This can be done by having the program select the closest duration or by having the MD Table 68 at the receiver contain a range. The system currently utilizes this latter approach and has the following MD Table 68 for the receiver 60 for the particular message unit given above:

TABLE II

| MESSAGE UNIT | HALF-WAVE DURATION BOUNDARY (microseconds) 2^(m−0.5)/24) |
|---|---|
| A | 3044 |
| B | 2957 |
| C | 2873 |
| D | 2791 |
| E | 2712 |
| F | 2634 |
| G | 2559 |
| H | 2487 |
| I | 2416 |
| J | 2347 |
| K | 2280 |
| L | 2215 |
| M | 2152 |
| N | 2091 |
| O | 2031 |
| P | 1974 |
| Q | 1917 |
| R | 1863 |
| S | 1810 |
| T | 1758 |
| U | 1708 |
| V | 1660 |
| W | 1612 |
| X | 1566 |
| Y | 1522 |
| Z | 1478 |
| Space | 1436 |
|  | 1396 etc. |

That is, in the TRANSMITTER 21, the MD Table 26 is in the form of message versus half-wave duration correspondence, and in the RECEIVER 60, the MD Table 68 is in the form message versus half-wave duration boundary correspondence.

The MD Table in TABLE I is an example and may represent, say, part of a 32-state coding, where each message unit has the same information content equivalent to 5 binary bits, i.e. 1 out of 32. TABLE I illustrates that similarly other MD Tables for various codings, e.g., for coding 4-, 8-, 10-, 24-, and 256-rate messages, etc. may be established and used.

The receiver computer 66 may also be a BBC Microcomputer Model B which is programmed in accordance with the flow diagram of FIG. 10 and the program given below. In this case the MD Table 68 is again held in the RAM.

The receiver 60 may not be easily made from the aforementioned computer but requires a wave measurement circuit 64. One preferred circuit 64 is depicted in FIG. 11.

Figure 11:
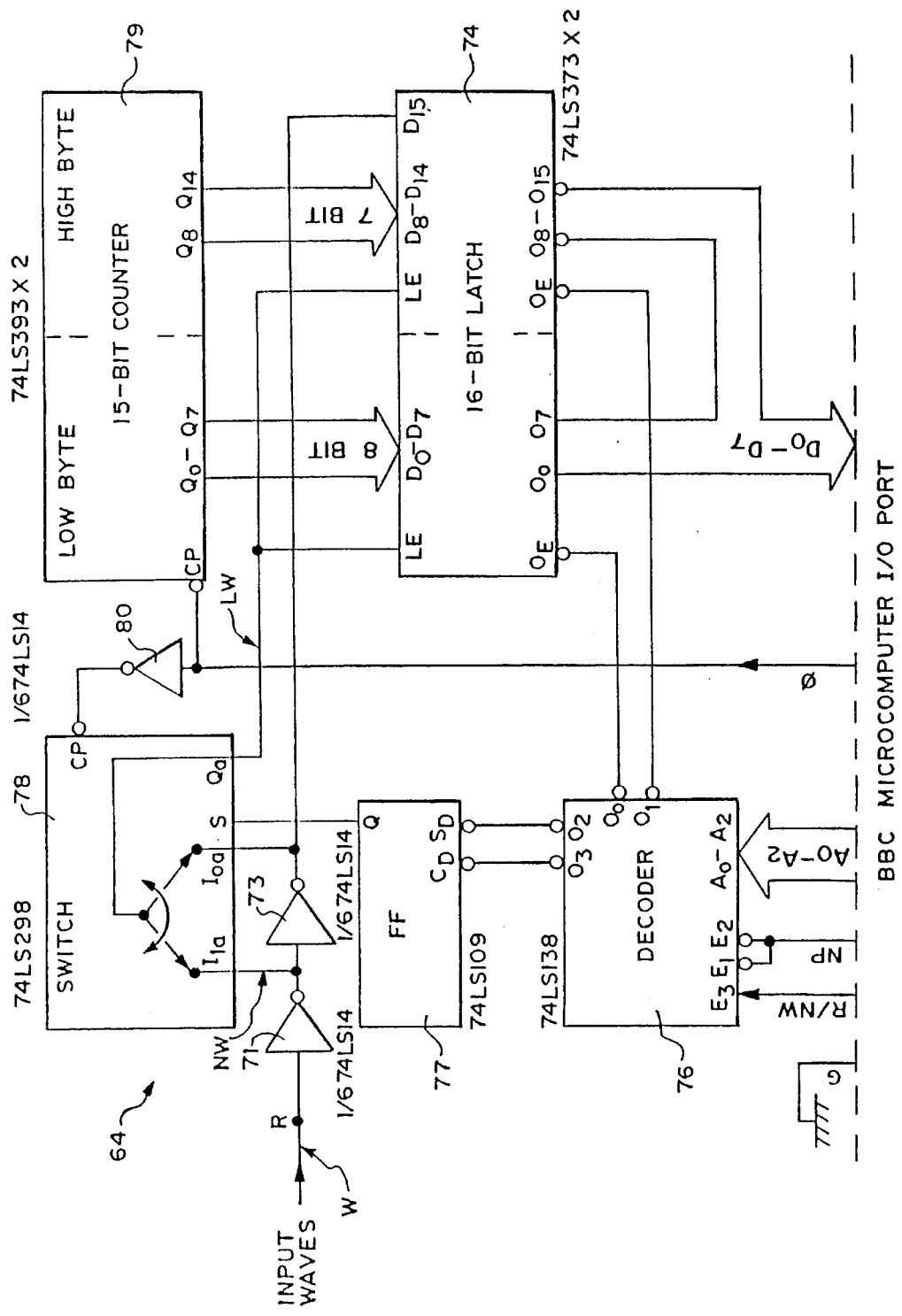
FIG. 11 is a circuit and block diagram of one particular embodiment for part of the system shown in FIG. 9.

The elements, values and interconnection of the circuit are given in FIG. 11. The circuit of FIG. 11 is connected to the I/O port known as the 1-MHz Extension Bus of the BBC Microcomputer. The conductors R/NW, NP, A0, A1, A2, D0, D1, D2, D3, D4, D5, D6, D7, and G of the circuit of FIG. 11 are respectively connected to R/NW, NPGFC, A0, A1, A2, D0, D1, D2, D3, D4, D5, D6, D7, and 0 V of the 1-MHz Extension Bus. The conductor φ of the circuit of FIG. 11 is supplied with timing clock pulses, in this embodiment with 4-MHz timing clock pulses from a separate crystal oscillator module.

In overall operation, the circuit 64 serves to measure the time instant at the occurrence of each waveform transition of the input wave and present this information to the Microcomputer 66.

Figure 12:
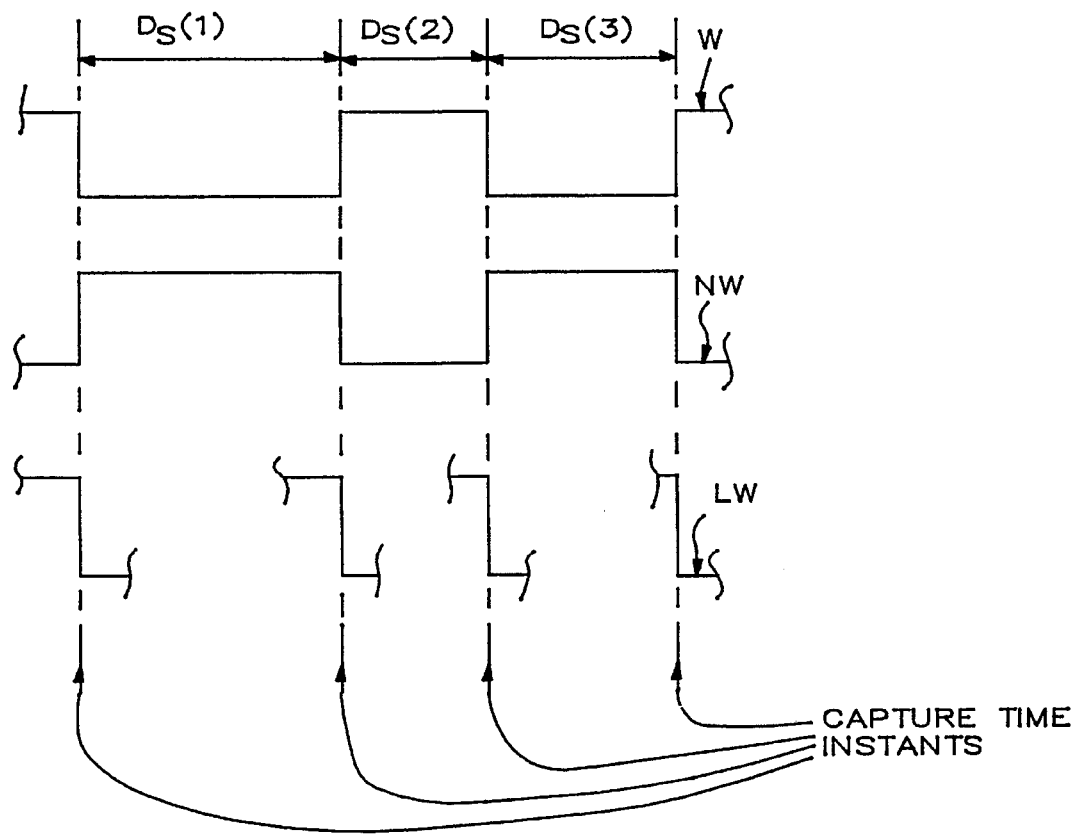
FIG. 12 is a set of waveforms useful in illustrating the operation of the system of the invention.

At the input R of the circuit 64 the received wave W is fed to inverting buffer 71 to produce at its output an inverted wave NW which is inverted once again by inverter 73 to recover an univerted wave W at the most significant bit D15 of a 16-bit latch 74. By using decoder 76, flip-flop 77 and switch 78 the computer 66 selectively feeds the waveform W or NW, alternately, to LE to produce a time-related latching waveform LW, which may be illustrated with FIG. 12. By sensing the HIGH or LOW voltage level of and, hence, transition in the waveform W at D15 the computer 66 (a) initializes LW to HIGH, (b) detects the occurrence of waveform transition in W, (c) takes a latched counter reading at 74 captured from counter 79 by a HIGH-to-LOW TRANSITION in LW, and (d) resets LW to HIGH to unlatch 74 for another capture. Clock pulses φ are provided (e.g. from a crystal oscillator module) to operate the counter 79 and through inverter 80 to operate switch 78. The captured counter readings obtained in this manner provide infromation on durations DS(1), DS(2), etc. of the received waveform W.

Figure 10:
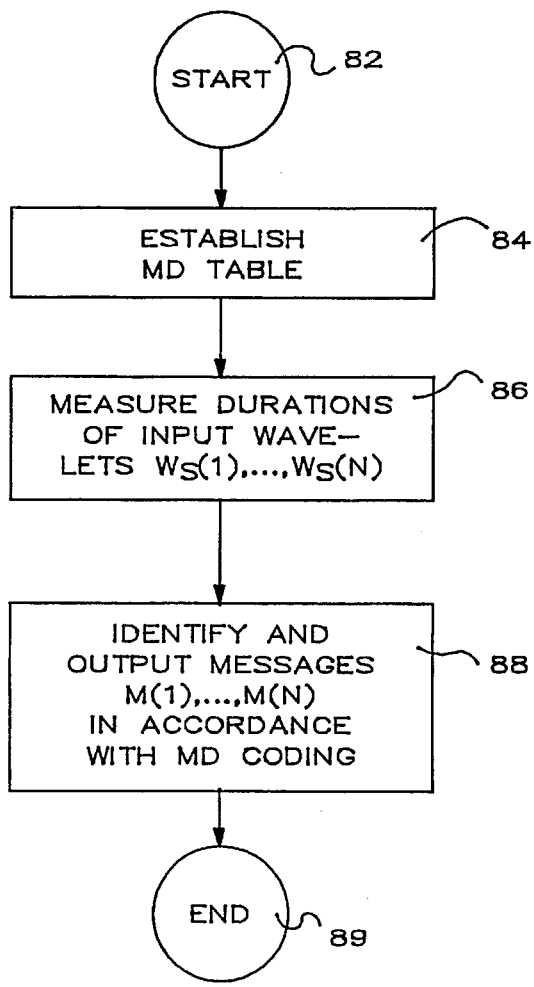
FIG. 10 is a flow chart illustrating the operation of the system shown in FIG. 9.

Referring to FIG. 10 the program upon start 82 initially establishes the MD Table in its RAM at step 84, e.g. by copying it from a disc drive or other more permanent memory. (In the case of a dedicated receiver this could take the form of a ROM chip). Thereafter, at block 86, it measures the duration (with unit 64) of the received wavelets and, at block 88, identifies message units in accordance with the MD Table and when completed terminates the program at end 89.

A suitable program that has been successfully operated in the aforementioned particular computer is as follows:

| Receiver Program I |
|---|

```
 136 REM INVENTED BY HO KIT-FUN
5001 REM UNPUBLISHED COPYRIGHT
5002 REM
5004 REM P.O. BOX 54504
5006 REM NORTH POINT
5008 REM HONG KONG
5010 REM RX1B (JULY 10, 1988)
5020 REM PRESTOL15F
5050 N=4 : REM NUMBER OF SIGNALS
5060 n=N+1 : REM NUMBER OF CTIME%
5070 CONSTANT1%=128*256
5080 DIM DSB%(32),CTIME%(n), DURATION%(N),STORAGE%(N),M(N)
5090 HTIME=&5500
5100 LTIME=HTIME+n+1
5105 STORAGE%=&4000 : REM STORAGAE LOCATION
5108 REM FOR M=0 TO 32:Ibound(M)=2^((M-0.5)/24):NEXT :
     REM INTERVAL BOUNDARIES
5109 GOSUB 9000:REM MESSAGE-HALF CYCLE DURATION TABLE
5110 W=&FC03 :REM WAVEFORM W
5120 NW=&FC02:REM WAVEFORM NW
5130 HBYTE=&FC01
5140 LBYTE=&FC00
5150 FOR PASS=0 TO 3 STEP 3
5160 P%=&D00
5170 [
5180          OPT PASS
5190          LDY #1
5200          LDA HBYTE       \HIGH BYTE
5210          BMI WAVE
5220 .NWAVE   LDA NW          \SWITCH TO NW
5230 .NWATI   LDA HBYTE
5240          BPL NWATI
5250          AND #127
5260          STA HTIME,Y
5270          LDA LBYTE
5280          STA LTIME,Y
5300          CPY #n
5310          BEQ STOP1
5315          INY
5320 .WAVE    LDA W           \SWITCH TO W
5330 .WATI    LDA HBYTE
5340          BMI WATI
5350          STA HTIME,Y
5360          LDA LBYTE
5370          STA LTIME,Y
5390          CPY #n
5400          BEQ STOP1
5405          INY
5410          JMP NWAVE
5420 .STOP1   RTS
5430 ]
5440 NEXT
5450 CALL &0D00
5470 REM COUNTER TIME
5480 FOR Y=1 TO n
5490 CTIME%(Y) = (?(HTIME+Y))*256+?(LTIME+Y)
5500 NEXT
5520 REM DURATION
5530 FOR Y=1 TO N
5540 DURATION%(Y) = CTIME%(Y+1) − CTIME%(Y)
5550 IF DURATION%(Y) < 0 THEN
     DURATION%(Y) = DURATION%(Y) + CONSTANT1%
5552 NEXT
5555 REM MESSAGE IDENTIFICATION
6000 FOR Y=1 TO N
6010 IF DURATION%(Y) > DSB%(0) THEN
     PRINT "ERROR IN MESSAGE (";Y;")":
     M(Y)=127:GOTO 8000
6020 IF DURATION%(Y) > DSB%(1) THEN M(Y)=0:GOTO 8000
6030 IF DURATION%(Y) > DSB%(2) THEN M(Y)=1:GOTO 8000
6040 IF DURATION%(Y) > DSB%(3) THEN M(Y)=2:GOTO 8000
6050 IF DURATION%(Y) > DSB%(4) THEN M(Y)=3:GOTO 8000
6060 IF DURATION%(Y) > DSB%(5) THEN M(Y)=4:GOTO 8000
6070 IF DURATION%(Y) > DSB%(6) THEN M(Y)=5:BOTO 8000
6080 IF DURATION%(Y) > DSB%(7) THEN M(Y)=6:GOTO 8000
6090 IF DURATION%(Y) > DSB%(8) THEN M(Y)=7:GOTO 8000
6100 IF DURATIDN%(Y) > DSB%(9) THEN M(Y)=8:GOTO 8000
6110 IF DURATIDN%(Y) > DSB%(10) THEN M(Y)=9:GOTO 8000
```

-continued

Receiver Program I

```
6120 IF DURATION%(Y) > DSB%(11) THEN M(Y)=10:GOTO 8000
6130 IF DURATION%(Y) > DSB%(12) THEN M(Y)=11:GOTO 8000
6140 IF DURATION%(Y) > DSB%(13) THEN M(Y)=12:GOTO 8000
6150 IF DURATION%(Y) > DSB%(14) THEN M(Y)=13:GOTO 8000
6160 IF DURATION%(Y) > DSB%(15) THEN M(Y)=14:GOTO 8000
6170 IF DURATION%(Y) > DSB%(16) THEN M(Y)=15:GOTO 8000
6171 IF DURATION%(Y) > DSB%(17) THEN M(Y)=16:GOTO 8000
6172 IF DURATION%(Y) > DSB%(18) THEN M(Y)=17:GOTO 8000
6173 IF DURATION%(Y) > DSB%(19) THEN M(Y)=18:GOTO 8000
6174 IF DURATIGN%(Y) > DSB%(20) THEN M(Y)=19:GOTO 8000
6175 IF DURATION%(Y) > DSB%(21) THEN M(Y)=20:GOTO 8000
6176 IF DURATION%(Y) > DSB%(22) THEN M(Y)=21:GOTO 8000
6177 IF DURATION%(Y) > DSB%(23) THEN M(Y)=22:GOTO 8000
6178 IF DURATION%(Y) > DSB%(24) THEN M(Y)=23:GOTO 8000
6179 IF DURATION%(Y) > DSB%(25) THEN M(Y)=24:GOTO 8000
6180 IF DURATION%(Y) > DSB%(26) THEN M(Y)=25:GOTO 8000
6181 IF DURATIGN%(Y) > DSB%(27) THEN M(Y)=26:GOTO 8000
6182 IF DURATION%(Y) > DSB%(28) THEN M(Y)=27:GOTO 8000
6183 IF DURATION%(Y) > DSB%(29) THEN M(Y)=28:GOTO 8000
6184 IF DURATION%(Y) > DSB%(30) THEN M(Y)=29:GOTO 8000
6185 IF DURATIDN%(Y) > DSB%(31) THEN M(Y)=30:GOTO 8000
6186 IF DURATIDN%(Y) > DSB%(32) THEN M(Y)=31:GOTO 8000
7000 PRINT "ERROR IN MESSAGE (";Y;")":M(Y)=255:GOTO 8000
8000 STORAGE%?Y = M(Y)
8115 IF STORAGE%?Y=27 THEN PRINT CHR$(32);
     ELSE PRINT CHR$(65+STORAGE%?Y);
8200 NEXT
8300 END
9000 REM DURATION BOUNDARIES:(FOR 4-MHZ TIMING CLOCK PULSES)
9560 DSB%(0)=12175
9562 DSB%(1)=11828
9564 DSB%(2)=11491
9565 DSB%(3)=11164
9566 DSB%(4)=10846
9570 DSB%(5)=10538
9572 DSB%(6)=10238
9574 DSB%(7)=9946
9576 DSB%(8)=9663
9578 DSB%(9)=9388
9580 DSB%(10)=9121
9582 DSB%(11)=8861
9584 DSB%(12)=8609
9586 DSB%(13)=8364
9588 DSB%(14)=8126
9690 DSB%(15)=7894
9592 DSB%(16)=7669
9593 DSB%(17)=7451
9594 DSB%(18)=7239
9595 DSB%(19)=7033
9596 DSB%(20)=6833
9597 DSB%(21)=6638
9598 DSB%(22)=6449
9599 DSB%(23)=6266
9600 DSB%(24)=6087
9601 DSB%(25)=5914
9602 DSB%(26)=5746
9603 DSB%(27)=5582
9604 DSB%(28)=5423
9605 DSB%(29)=5269
9606 DSB%(30)=5119
9607 DSB%(31)=4973
9608 DSB%(32)=4831
9700 RETURN
```

The computer is programmed with the above program to measure the half-wave (i.e. the half-cycle wavelet) durations by recording the time instants as each transition of the wave occurs. The procedure for measuring the half-wave durations is depicted in the timing diagram shown in FIG. 12.

The RECEIVER 60 thus automatically interprets the half-cycle duration-coded wavelets, identifies and outputs the message conveyed, and stores the messages for possible subsequent use.

Message Storage/Retrieval System

Figure 13:
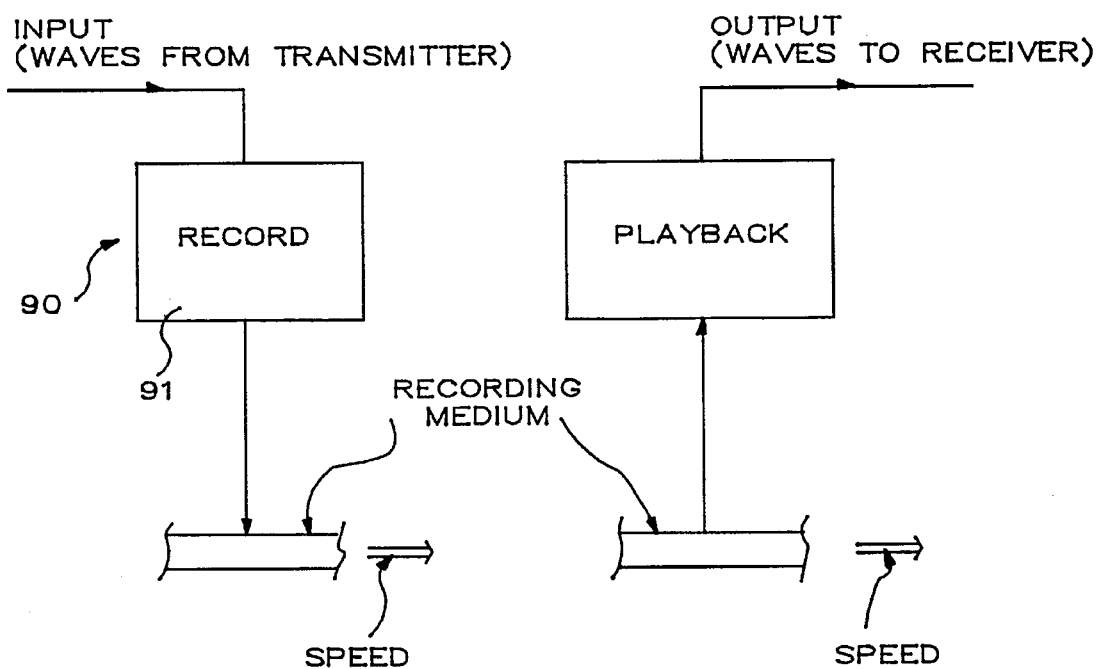
FIG. 13 is a schematic block diagram of a record/playback unit of the system employing a recording media (such as a magnetic tape).

Referring to FIG. 13 there is depicted a novel Message Storage/Retrieval system 90 (i.e. an information recording system).

The System 90 is realized by inserting between the Transmitter 21 and the Receiver 60, a wavelet-transition record/playback unit such as a magnetic or optical recorder 91. The half-cycle duration-coded wavelets may be recorded as half-cycle wavelengths on a recording track.

Figure 14:
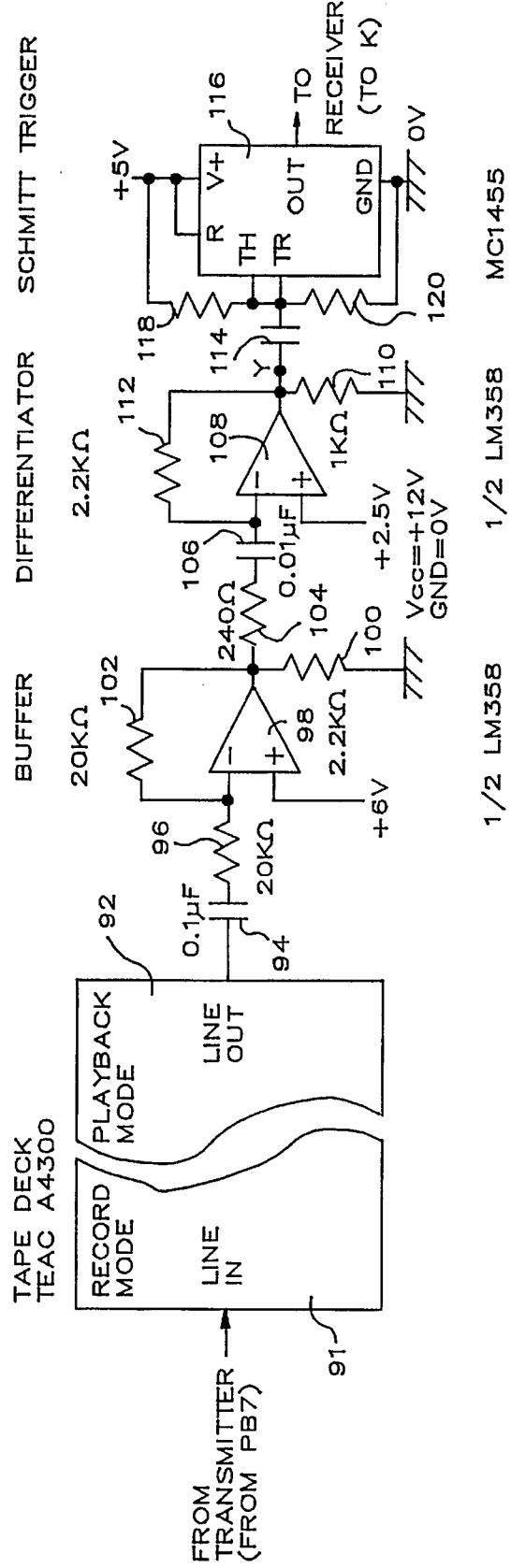
FIG. 14 is a detailed electrical circuit diagram of the record/playback unit shown in FIG. 13.

A possible wavelet-transition record/playback unit for use in the system 90 can be realized with a commercially available tape deck and additional hardware as shown in FIG. 14. For example, a TEAC (trade mark) A-4300 with open-reel tape Maxell (trade mark) XLI 35-90B is used with its recording level adjusted such that its monitor line output is about 0.6 volts peak-to-peak. Its playback level is adjusted to give a signal of about 2 volts peak-to-peak at circuit point Y.

The half-cycle duration-coded wavelets from the Transmitter 21 are fed to the input LINE IN of the tape deck 91 and recorded at one speed. Upon playback at same speed on the same (or another) tape deck operating at playback mode 92 the half-cycle duration-coded wavelets first recorded is retrieved and output at LINE OUT of the tape deck. The signal is fed to a buffer, through a capacitor 94 and resistor 96 to the inverting input of an operational amplifier 98 which has a non-inverting input biased to +6 V, i.e. ½ Vcc. A portion of the output of operational amplifier 98 is fed through a resistor 100 to chassis ground and through resistor 102 back to its inverting input. The other portion of the output is fed to a differentiator, through a resistor 104 and capacitor 106 to the inverting input of an operational amplifier 108 which has a non-inverting input biased to +2.5 V and a portion of its output is fed through resistor 110 to chassis ground and through resistor 112 back to its inverting input. The other portion of the output of the operational amplifier 108 is fed through circuit point Y and capacitor 114 to a Schmitt trigger 116. The Schmitt trigger 116 consists of a MC1455 TIMER with its R and V+ points connected to +5 V, its GND to chassis ground, and its input points TH and TR tied together at the mid-point of a potential divider formed with equal resistors 118 and 120 across +5 V and chassis ground. The half-cycle duration-coded output wavelets from the Schmitt trigger 116 are fed to the Receiver 60. Hence, in overall operation message units fed to the input of the transmitter of the system are transmitted via a recording medium, through recording and playback processes, to a receiver of the system, which outputs same message units, whereby information transmission is achieved.

The system of the present invention is quite versatile and may be employed in different manners. One such manner would be to use a set of half-cycle durations differing by equal duration increments in the transmission system. (For example using a set of half-cycle durations such as . . . , 2494, 2497, 2500, 2503, . . . etc. in microseconds wherein the duration increment is 3 microseconds as practised in a following concrete example.) In this manner of MD coding it should be noted that if the least duration in the set is predetermined and the magnitude of the equal duration increment also predetermined then in this invention there is a preferred number of half-cycle durations for the set, i.e. a preferred coding for speedy (i.e. fast) transmissions of random information (i.e. equally likely message units) as indicated in TABLE III shown below.

TABLE III

| (EQUAL DURATION INCREMENT) / (LEAST DURATION OF SET) | PREFERRED NUMBER OF STATES FOR CODING |
|---|---|
| 0.2 | 8 |
| 0.15 | 10 |
| 0.07 | 16 |
| 0.025 | 32 |
| 0.0098 | 64 |

TABLE III-continued

| (EQUAL DURATION INCREMENT) / (LEAST DURATION OF SET) | PREFERRED NUMBER OF STATES FOR CODING |
|---|---|
| 0.00404 | 128 |
| 0.00172 | 256 |
| etc. | |

TABLE III shows several preferred embodiments for achieving fast transmission systems. It shows the preferred number of members of a set of half-cycle wavelets having half-cycle durations differing by equal duration increments for each of several specific values of the ratio of $$\frac{\text{(equal half-cycle duration increment)}}{\text{(least half-cycle duration in the set)}}.$$

In other words, it reveals several examples of preferred message to half-cycle durations coding for fast transmission of information, and in each case the rate of information transmisson would be slower if the preferred coding is not observed.

TABLE III is useful in showing the practice to be followed in order to build various practical systems to achieve fast transmission of information. Hence, if our object is to achieve fast transmission in the process and system we should follow the teachings of TABLE III. TABLE III shows the preferred MD coding to be used in various embodiments where the value of the ratio of (equal duration increment)/(least duration of the set)

is already predetermined. Namely, if the above-mentioned ratio in a system is already pre-determined to have a value of about 0.2, 0.15, 0.07, 0.025, 0.0098, 0.00404, or 0.00172, etc. then this invention prefers the number of members of half-cycle durations to be used in the MD coding for each respective case to be approximately 8, 10, 16, 32, 64, 128 or 256 etc. , respectively, in order to achieve a fast system for transmission of information.

The use of TABLE III is further explained with the following example: Say, if the least duration and magnitude of duration increment for such coding are chosen to be 100 and 20 microseconds, respectively, (i.e. the ratio of (equal duration increment)/(least duration of the set) chosen to be 0.2) then, as revealed by TABLE III this invention prefers the use of 8-state (1-of-8 message) coding, i.e. a set of 8 half-cycle durations, and, consequently, the set of half-cycle durations to be used should be 100, 120, 140, 160, 180, 200, 220 and 240 microseconds, respectively, to achieve a fast transmission system.

Alternatively, in building practical systems, TABLE III may also be used as follows. For example, if we want to built a practical transmission system which is to employ a set of half-cycle durations differing by equal duration increments to transmit, say, information series consisting of equally likely 1-of-64 message units, then, according to TABLE III we should choose the value of the ratio of (equal duration increment)/(least duration of set)

to be about 0.0098 if speedy transmission is desired.

In addition, by observing the above teachings of and descriptions on Table III in practising the Transmitter 21 and Receiver 60 for fast transmission of information we achieve a Message Storage/Retrieval system 90, as described above, (which is inserted between Transmitter 21 and Receiver 60 as shown in FIG. 13) that would result in efficient use of the length of the recording track, i.e. efficient use of recording medium. Because fast information transmission from the Transmitter 21 (meaning more information transmitted per unit time) results in fast information recording (i.e. more information from Transmitter 21 is recorded per unit time) at recorder 91. And, consequently, for a given recording speed, more information is, therefore, recorded on a given length of the recording track of system 90. In other words we achieve a high information density on the recording medium of the recording system.

Furthermore, as a concrete example of this system, a 256-duration MD coding is specificly used in the embodiment described as follows. The system can be achieved by coupling the specific transmitter 21 to the specific receiver 60 described above through a suitable transmission media with the transmitter 21 programmed with the program hereafter listed:

Trasmitter Program II

```
10 REM INVENTED BY HO KIT-FUN
20 REM
30 REM P.O. BOX 54504
40 REM NORTH POINT
50 REM HONG KONG
60 REM
70 REM T.TX2A    (20.7.1988)
80 REM PRESTOB25A
85 REM
90 ?&FE6B=&C0 : REM SET USER 6522 AT FREE-RUNNING MODE
92 ?&FE62=&80 : REM INITIALIZE OUTPUT (SET PB7 AT HIGH)
94 ?&FE6E=&00 : REM INTERRUPT DISABLED
100 REM
110 REM ESTABLISH MESSAGE-INTERVAL CODING TABLE
120 DLEAST%=1744:LEAST HALF-CYCLE DURATION, PROGRAMMABLE
125 DD%=3 : REM DURATION INCREMENT
130 DELAY%=3
140 DSL%=&4000 :DSH%=&5000 : REM LOCATION OF MI TABLE
145 DIM LOCATION%(255)
150 FOR M = 0 TO 255 : REM THE MESSAGE IS ANY INTEGER IN THE
    RANGE 0-255
180 REM (EACH MESSAGE HAS THE SAME INFORMATION CONTENT AS 8
    BINARY BITS)
200 DS%=DLEAST%+M*DD% : REM COMPUTE SIGNAL "HALF-CYCLE"
    DURATION
230 DS%=DS%-DELAY% : REM DELAY CORRECTION
232 REM TRUE DURATION = PROGRAMMED DURATION + DELAY
233 REM DURATIONS IN TABLE
235 DSH%?M=DS% DIV 256
238 DSL%?M=DS% MOD 256
240 NEXT M
245 REM: FOR A SPECIFIC RANDOMLY ASSIGNED MD TABLE
250 DATA   21,36,51,1,             231,198,40,125,
           2,111,159,10,           68,220,232,5
251 DATA   61,123,222,249,         46,19,92,151,
           188,215,3,4,            56,101,223,175
252 DATA   77,8,25,26,             97,132,255,69,
           105,143,211,6,          90,228,196,203
253 DATA   83,49,126,119,          246,9,43,117,
           208,29,30,224,          138,139,13,17
254 DATA   157,182,201,127,        52,33,147,113,
           55,28,115,187,          194,243,64,22
255 DATA   59,226,238,200,         87,190,41,15,
           66,72,229,240,          253,75,31,23
256 DATA   122,18,45,62            191,205,24,221,
           44,245,109,93           42,14,186,227
257 DATA   155,154,153,39,         11,71,76,104,
           95,100,169,207,         216,144,131,120
258 DATA   150,140,130,160,        168,212,233,244,
           177,166,48,73,          96,112,165,172
259 DATA   133,170,219,242,        27,53,78,108,
           136,145,146,213,        236,250,199,50
260 DATA   184,185,148,60,         16,80,82,98,
           178,209,210,241,        152,54,57,114
261 DATA   110,70,32,86,           89,135,197,247,
           206,116,65,67,          74,141,204,239
262 DATA   252,156,174,134,        84,88,158,230,
           202,149,161,217,        91,94,103,118
263 DATA   128,99,106,102,         225,171,163,167,
           192,193,189,181,        179,195,176,0
264 DATA   137,237,107,38,         164,235,183,20,
           58,173,218,251,         35,63,124,162
265 DATA   214,79,37,142,          180,81,12,129,
           234,248,254,34,         47,85,7,121
```

| Trasmitter Program II |
|---|

```
268 LOCATION%=&3800
270 FOR MESSAGE% = 0 TO 255
272 READ M
275 LOCATION%?(MESSAGE%) = M
280 NEXT
290 REM INPUT MESSAGES
300 N=128 : REM TAKE N INPUT MESSAGES
    (N =1,11,128 ETC., PROGRAMMABLE)
320 DTA%=&3000 : ?DTA%=N
330 FOR NUM% = N TO 1 STEP −1
340 INPUT MESSAGE%
350 DTA%?(NUM%)=LOCATION%?(MESSAGE%)
360 NEXT
390 REM USING THE USER VIA
400 REM GENERATE WAVES
410 REM IN ACCORDANCE WITH MD TABLE
420 FOR PASS = 0 TO 3 STEP 3
430 P%=&0D00
440 [
450 OPT PASS
500 LDX DTA%
502 LDA DTA%,X
504 TAY
506 LDA DSL%,Y
508 STA &FE64           544 LOAD 16-BIT COUNTER
510 LDA DSH%,LY         544 WITH FIRST
512 STA &FE65           544 SIGNAL DURATION
514 JMP LAST
550 .LOOP LDA DTA%,X
560 TAY
570 LDA DSL%,Y
580 STA &FE66           544 LOAD 16-BIT LATCH
590 LDA DSH%,Y          544 WITH NEXT
600 STA &FE67           544 SIGNAL DURATION
620 .STS BIT &FE6D
630 BVC STS             544 WAIT TILL A TIME-OUT
640 .LAST DEX
650 BEQ STP                  544 LAST D?
660 JMP LOOP
690 .STP LDA #&80
700 STA &FE6B
710 RTS
720 ]
730 NEXT PASS
640 CALL &0D00
750 PRINT CHR$(7)
770 END
```

The receiver 60 of FIGS. 9 and 11 may be exployed with Microcomputer 66, programmed with the following program.

| Receiver Program II |
|---|

```
 136 REM INVENTED BY HO KIT-FUN
5001 REM UNPUBLISHED COPYRIGHT
5002 REM
5004 REM P.O. BOX 54504
5006 REM NORTH POINT
5008 REM HONG KONG
5010 REM RX2A (JULY 20, 1988)
5020 REM PRESTOL23A
5050 N=128 : REM NUMBER OF SIGNALS
5060 n=N+1 : REM NUMBER OF CTIME%
5070 CONSTANT1%=128*256
5080 DIM DSB(257),CTIME%(n), DURATION%(N),
        STORAGE%(N),M(256),LOCATION%(256)
5090 HTIME=&5500
5100 LTIME=HTIME+n+1
5105 STORAGE%=&4800 : REM STORAGAE LOCATION
5108 REM
5109 GOSUB 9000:REM MD TABLE
5110 W=&FC03 :REM WAVEFORM W
5120 NW=&FC02:REM WAVEFORM NW
```

Receiver Program II

```
5130 HBYTE=&FC01
5140 LBYTE=&FC00
5150 FOR PASS=0 TO 3 STEP 3
5160 P%=&D00
5170 [
5180            OPT PASS
5190            LDY #1
5200            LDA HBYTE       \HIGH BYTE
5210            BMI WAVE
5220 .NWAVE     LDA NW          \SWITCH TO NW
5230 .NWATI     LDA HBYTE
5240            BPL NWATI
5250            AND #127
5260            STA HTIME,Y
5270            LDA LBYTE
5280            STA LTIME,Y
5300            CPY #n
5310            BEQ STOP1
5315            INY
5320 .WAVE      LDA W           \SWITCH TO W
5330 .WATI      LDA HBYTE
5340            BMI WATI
5350            STA HTIME,Y
5360            LDA LBYTE
5370            STA LTIME,Y
5390            CPY #n
5400            BEQ STOP1
5405            INY
5410            JMP NWAVE
5420 .STOP1     RTS
5430 ]
5440 NEXT
5450 CALL &0D00
5470 REM COUNTER TIME
5480 FOR Y=1 TO n
5490 CTIME%(Y) = (?(HTIME+Y))*256+?(LTIME+Y)
5500 NEXT
5520 REM DURATION
5530 FOR Y=1 TO N
5540 DURATION%(Y) = CTIME%(Y+1) – CTIME%(Y)
5550 IF DURATION%(Y) < 0 THEN
     DURATION%(Y) = DURATION%(Y) + CONSTANT1%
5552 NEXT
5555 REM MESSAGE IDENTIFICATION
6000 FOR Y=1 TO N
6010 IF DURATION%(Y) > DSB(0) THEN PRINT
     "ERROR IN MESSAGE (";Y;")":
     M(Y)=127:GOTO 8000
6020 m=1
6030 IF DURATION%(Y) > DSB(m) THEN M(Y)=m-1:GOTO 8000
6040 m=m+1
6045 IF m=257 THEN PRINT "ERROR IN MESSAGE (";Y;")":
     M(Y)=255:GOTO 8000
6050 GOTO 6030
8000 STORAGE%?Y =LOCATION%?M(Y)
8100 PRINT "MESSAGE (";Y;") = ";STORAGE%?Y: REM DISPLAY
     CONFIDENTIAL DATA
8200 NEXT
8300 END
9000 REM DURATION BOUNDARIES:
9550 DLEAST=1744:DD=3:MHZ=4
9560 FOR m=0 TO 256:DSB(m)=MHZ*(DLEAST–DD/2+m*DD):NEXT
9570 REM FOR A SPECIFIC RANDOMLY ASSIGNED MD TABLE
9600 DATA    223,  3,  8, 26,          27, 15, 43,254,
              33, 53, 11,116,         246, 62,109, 87
9610 DATA    164, 63, 97, 21,         231,  0, 79, 95,
             102, 34, 35,148,          73, 57, 58, 94
9620 DATA    178, 69,251,236,           1,242,227,115,
               6, 86,108, 54,         104, 98, 20,252
9630 DATA    138, 49,159,  2,          68,149,173, 72,
              28,174,232, 80,         163, 16, 99,237
9640 DATA     78,186, 88,187,          12, 39,177,117,
              89,139,188, 93,         118, 32,150,241
9650 DATA    165,245,166, 48,         196,253,179, 84,
             197,180, 44,204,          22,107,205,120
9660 DATA    140, 36,167,209,         121, 29,211,206,
             119, 40,210,226,         151,106,176,  9
9670 DATA    141, 71,175, 74,         180, 55,207, 51,
```

-continued

Receiver Program II

|  | 127,255, 96, 17, | 238, 7, 50, 67 |
|---|---|---|
| 9680 DATA | 208,247,130,126, | 37,144,195,181, |
|  | 152,224, 60, 61, | 129,189 ,243, 41 |
| 9690 DATA | 125,153,154, 70, | 162,201,128, 23, |
|  | 172,114,113,112, | 193, 64,198, 10 |
| 9700 DATA | 131,202,239,214, | 228,142,137,215, |
|  | 132,122,145,213, | 143,233,194, 31 |
| 9710 DATA | 222,136,168,220, | 244,219, 65,230, |
|  | 160,161,110, 75, | 24,218, 85,100 |
| 9720 DATA | 216,217, 76,221, | 46,182, 5,158, |
|  | 83, 66,200, 47, | 190,101,184,123 |
| 9730 DATA | 56,169,170, 42, | 133,155,240, 25, |
|  | 124,203,234,146, | 13,103, 18, 30 |
| 9740 DATA | 59,212, 81,111, | 45, 90,199, 4, |
|  | 14,134,248,229, | 156,225, 82,191 |
| 9750 DATA | 91,171,147, 77, | 135,105, 52,183, |
|  | 249, 19,157,235, | 192, 92,250, 38 |
| 9800 LOCATION%=&6000 | | |
| 9820 FOR M=0 TO 255 | | |
| 9840 READ MESSAGE% | | |
| 9860 LOCATION%?M=MESSAGE% | | |
| 9880 NEXT | | |
| 9889 RETURN | | |

With the system so constructed a 256-state MD Table is provided in the system. An example of such a table is as follows:

TABLE IV

| MESSAGE UNIT | DS |
|---|---|
| 223 | 2509 |
| 3 | 2506 |
| 8 | 2503 |
| 26 | 2500 |
| 27 | 2497 |
| 15 | 2494 |
| 43 | 2491 |
| 254 | 2488 |
| 33 | 2485 |
| 53 | 2482 |
| . | . |
| . | . |
| . | . |
| 192 | 1553 |
| 92 | 1750 |
| 250 | 1747 |
| 38 | 1744 |

(256 randomly-paired MD coding)

Wherein each of the 256 message units may be arbitrarily assigned letters and numbers or other digital data. When many-state, such as this 256-state MD coding is used the system is especially suitable for data transmission, confidential data in particular. Note that, conventional binary bit-by-bit decoding systems, such as those operating in RS232 standard, would not readily decode the transmitted half-cycle wavelets WS(1), WS(2), etc., of the system. And, now, using a random order in the MD coding, i.e. randomized MD coding such as that shown in TABLE IV would add a layer of complexity, making it difficult to break as a code.

In operation, at the Transmitter 21 each condidential 256-state message unit is converted into a half-cycle duration-coded wavelet, in this case at 1 byte of information per half-cycle wavelet, and 1 byte of information at a time according to the secret MD Table, which contains a set of 256 message units each of which has been randomly assigned to 1 of 256 half-cycle durations.

At the Receiver 60 such received wavelets are detected and deconverted into the original confidential message units at 1 byte of information per received half-cycle wavelet, and 1 byte at a time in accordance with the same secret 256-state MD coding.

It is not practical to guess at the secret MD coding if such coding is not provided since the number of permutations in this case involves 256 factorial and the secret MD coding can be changed from time to time. Hence, such half-cycle duration-coded wavelets, even if intercepted at the path between the Transmitter 21 and the Receiver 60 do not easily reveal the message being conveyed. (Of course, it is understood that in the same general manner non-confidential messages or data may also be transmitted via this system.)

The present invention also provides an information transimssion system which has degradeable properties. In a practical transmission system there may be transmission errors due to imperfections which result in a half-cycle duration longer, or shorter than the intended half-cycle duration to be detected and decoded. The present invention provides a waveform (e.g. as shown in FIG. 1) which is especially suitable for the transmission of degradeable information. The present system transmits information (message units) by transmitting respective duration-coded half-cycle waves whereby a small error in the detected half-cycle duration causes only a small error in the recover message unit, and a greater error in the detected half-cycle duration causes only a gradually greater error in the recovered message unit, dependent on the amount of duration error in the detected half-cycle wavelet. That means increasing amount of transmission errors in the form of half-cycle duration errors would cause increasingly less accurate, but still meaningful and useful information (message units) to be recovered. These properties make the system especially suitable for the transmission of numeric information such as magnitudes and values, and, in particular, digitized analog signals. Such properties of the transmission system are achieved by purposely arranging the message half-cycle duration correspondence (i.e. message half-cycle duration representation) in a special manner. Namely, it is achieved by having increasing (or decreasing) half-cycle durations respectively represented by (i.e. assigned to or paired up with) accending (or decending) numeric values for conversion between message units and half-cycle durations. Such arrangement of MD correspondence is further explained in detail as follows. Say, we want to transmit value messages ranging from 0 to 255. We would, therefore, employ a MD correspondence arranged in the manner described above, for example, as illustrated by the following MD table, TABLE V.

TABLE V

| MESSAGE UNIT | DS |
|---|---|
| 0 | 2509 |
| 1 | 2506 |
| 2 | 2503 |
| 3 | 2500 |
| 4 | 2497 |
| 5 | 2494 |
| 6 | 2491 |
| 7 | 2488 |
| 8 | 2485 |
| 9 | 2482 |
| . | . |
| . | . |
| . | . |
| 100 | 2209 |
| 101 | 2206 |
| 102 | 2203 |
| 103 | 2200 |
| 104 | 2197 |
| 105 | 2194 |
| . | . |
| . | . |
| . | . |
| 252 | 1753 |
| 253 | 1750 |
| 254 | 1747 |
| 255 | 1744 |

(256 MD coding arranged in ascending values)

Hence, the degradeable properties of the system is achieved by using such MD representation in the transmitter 21 and receiver 60 of the present system. The following description would further explain the operation of the system. For example, at the transmitter 21 a certain magnitude value (message unit) of say, 103 is transmitted in the form of a half-cycle wavelet, say as WS(N) of FIG. 1, having a half-cycle duration DS(N) of 2200 microseconds in accordance with the above TABLE V (MD table 26). Now, suppose that transmission error has occurred in the overall practical transmission system due to imperfections such as distortion, noise, shift or jitter, or wow and flutter in a recoder, etc. which caused an erroneous half-cycle duration DS(N) of, say, 2202 microseconds to be detected from the received WS(N) at the receiver 60. Then, in accordance with the same MD representation of TABLE V (MD table 68) the receiver 60 of the system would therefore recover from the received WS(N) a magnitude value (message unit) of 102, which is an erroneous but close value. If the transmitted magitude value (message unit) had been taken from, say, the output from an 8-bit A/D converter measuring an audio signal it is apparent that this inaccurate, recovered magnitude at the receiver may still be meaningful and useful in, say, re-constructing the original audio signal. Therefore, in the present transmission system such type of transmission error only degrades the accuracy of the transmitted information.

A concrete embodiment of the degradeable information transmission system, employing the MD representation described above, is achieved, again by coupling transmitter 21 to receiver 60 described above through a suitable transmission media. In this case transmitter 21 is programmed with Transmitter Program III. Transmitter Program III is same as Transmitter Program II, but with the lines 250–265 replaced with the followings lines:

| 250 DATA | 0, 1, 2, 3, 8, 9, 10, 11, | 4, 5, 6, 7, 12, 13, 14, 15 |
|---|---|---|
| 251 DATA | 16, 17, 18, 19, 24, 25, 26, 27, | 20, 21, 22, 23, 28, 29, 30, 31 |
| 252 DATA | 32, 33, 34, 35, 40, 41, 42, 43, | 36, 37, 38, 39, 44, 45, 46, 47 |
| 253 DATA | 48, 49, 50, 51, 56, 57, 58, 59, | 52, 53, 54, 55, 60, 61, 62, 63 |
| 254 DATA | 64, 65, 66, 67, 72, 73, 74, 75, | 68, 69, 70, 71, 76, 77, 78, 79 |
| 255 DATA | 80, 81, 82, 83, 88, 89, 90, 91, | 84, 85, 86, 87, 92, 93, 94, 95 |
| 256 DATA | 96, 97, 98, 99, 104, 105, 106, 107, | 100, 101, 102, 103, 108, 109, 110, 111 |
| 257 DATA | 112, 113, 114, 115, 120, 121, 122, 123, | 116, 117, 118, 119, 124, 125, 126, 127 |
| 258 DATA | 128, 129, 130, 131, 136, 137, 138, 139, | 132, 133, 134, 135, 140, 141, 142, 143 |
| 259 DATA | 144, 145, 146, 147, 152, 153, 154, 155, | 148, 149, 150, 151, 156, 157, 158, 159 |
| 260 DATA | 160, 161, 162, 163, 168, 169, 170, 171, | 164, 165, 166, 167, 172, 173, 174, 175 |
| 261 DATA | 176, 177, 178, 179, 184, 185, 186, 187, | 180, 181, 182, 183, 188, 189, 190, 191 |
| 262 DATA | 192, 193, 194, 195, 200, 201, 202, 203, | 196, 197, 198, 199, 204, 205, 206, 207 |
| 263 DATA | 208, 209, 210, 211, 216, 217, 218, 219 | 212, 213, 214, 215, 220, 221, 222, 223 |
| 264 DATA | 224, 225, 226, 227, 232, 233, 234, 235, | 228, 229, 230, 231, 236, 237, 238, 239 |
| 265 DATA | 240, 241, 242, 243 248, 249, 250, 251, | 244, 245, 246, 247, 252, 253, 254, 255 |

And in this concrete example the receiver 60 of FIGS. 9 and 11 is programmed with Receiver Program III. Receiver Program III is same as Receiver Program II, but with lines 9570–9750 replaced by the following lines:

| 9570 REM FOR A SPECIFICALLY ASSIGNED MD TABLE | | |
|---|---|---|
| 9600 DATA | 0, 1, 2, 3, 8, 9, 10, 11, | 4, 5, 6, 7, 12, 13, 14, 15 |
| 9610 DATA | 16, 17, 18, 19, 24, 25, 26, 27, | 20, 21, 22, 23, 28, 29, 30, 31 |
| 9620 DATA | 32, 33, 34, 35, 40, 41, 42, 43, | 36, 37, 38, 39, 44, 45, 46, 47 |
| 9630 DATA | 48, 49, 50, 51, 56, 57, 58, 59, | 52, 53, 54, 55 60, 61, 62, 63 |
| 9640 DATA | 64, 65, 66, 67, 72, 73, 74, 75, | 68, 69, 70, 71, 76, 77, 78, 79 |
| 9650 DATA | 80, 81, 82, 83, 88, 89, 90, 91, | 84, 85, 86, 87, 92, 93, 94, 95 |
| 9660 DATA | 96, 97, 98, 99, 104, 105, 106, 107, | 100, 101, 102, 103 108, 109, 110, 111 |
| 9670 DATA | 112, 113, 114, 115, 120, 121, 122, 123, | 116, 117, 118, 119 124, 125, 126, 127 |
| 9680 DATA | 128, 129, 130, 131, 136, 137, 138, 139, | 132, 133, 134, 135, 140, 141, 142, 143 |
| 9690 DATA | 144, 145, 146, 147, 152, 153, 154, 155, | 148, 149, 150, 151, 156, 157, 158, 159 |
| 9700 DATA | 160, 161, 162, 163, 168, 169, 170, 171, | 164, 165, 166, 167, 172, 173, 174, 175 |
| 9710 DATA | 176, 177, 178, 179, 184, 185, 186, 187, | 180, 181, 182, 183, 188, 189, 190, 191 |
| 9720 DATA | 192, 193, 194, 195, 200, 201, 202, 203, | 196, 197, 198, 199, 204, 205, 206, 207 |
| 9730 DATA | 208, 209, 210, 211, 216, 217, 218, 219, | 212, 213, 214, 215, 220, 221, 222, 223 |
| 9740 DATA | 224, 225, 226, 227, 232, 233, 234, 235, | 228, 229, 230, 231, 236, 237, 238, 239 |
| 9750 DATA | 240, 241, 242, 243, 248, 249, 250, 251, | 244, 245, 246, 247, 252, 253, 254, 255 |

The present invention may be practiced in another manner to provide an information transmission system with error checking. This system may be achieved by employing a transmitter which transmits error-checking message units which are derived from the contents of the message units being transmitted, wherein the error-checking message units are derived according to a specific error-checking scheme, such as a "checksum", and are determined by and consistent with the specific contents of the message units being transmitted. The receiver of the system subsequently identifies the received error-checking message units, and employs the same specific error-checking scheme and independently derives from the specific contents of the received message units corresponding derived error-checking message units. The receiver then attempts to match the respective received and derived error-checking message units, and identifies transmission error if they do not match. Hence, if the message units to be transmitted are, say, M(1), M(2) M(3) . . . etc., the transmitter (and subsequently the receiver) employs an error checking scheme to obtain error-checking message units such that the error-checking message units are dependent of the specific contents of M(1), M(2) M(3), . . . , etc. A simple error-checking scheme is currently preferred to produce from the message units being transmitted an error-checking message unit, such as deriving an error message unit representative of the arithmatic sum of the contents of the message units to be transmitted. One such simple scheme currently employed is to set an error-checking message unit equal to CHECKSUM MOD 256, where CHECKSUM=M(1)+M(2)+M(3)+. . . etc. i.e. find the arithmethic sum of the contents of the message units, and take the error-checking message unit to be the remainder of such arithmatic sum divided by 256. The following description further explains the process of the system. Suppose, for simplicity, six specific message units 192, 8,5,108,25 and 86 are to be transmitted. The transmitter then evaluate 192+8+5+108+25+86 to be 424 and sets the error-checking message unit to be 168 (i.e. 424 mod 256) and transmits 168 along with the message units 192, 8,5,108,25, and 86. Upon reception of the transmitted half-cycle duration-coded waveforms the receiver of the system identifies 168 as the received error-checking message unit, and evaluates the derived error-checking message unit to be 168 from the received message units 192, 8, 5, 108, 25, and 86 (using the same error-checking scheme as the transmitter), and matches the respective received and derived error-checking message unit for inequality. Had the transmitted half-cycle wavelet for, say, message unit 8 been decoded by the receiver as 9, the derived error-checking message unit would have been 169 and the receiver would therefore detect transmission error because of the mismatch between 169 and 168 (i.e. the received error-checking message unit).

A concrete embodiment of the above described information transmission system with transmission error-checking is achieved, again by coupling transmitter 21 of FIG. 6 to receiver 60 of FIGS. 9 and 11 through a suitable transmission media. In this case transmitter 21 is programmed with Transmitter Program V. Transmitter program V is same as Transmitter Program III, but with the lines 300 and 330 replaced and lines 295, 355, and 370 added as follows:

```
295 CHECK%=0
300 N=129: REM TAKE N-1 INPUT MESSAGES (N=11,65 ETC.,
    PROGRAMMABLE)
330 FOR NUM% = N TO 2 STEP -1
355 CHECK%=CHECK%+MESSAGE%
370 NUM%=1:DTA%?(NUM%)=LOCATION%?(CHECK% MOD 256)
```

And in this concrete example the receiver 60 is programmed with Receiver Program V. Receiver Program V is same as Receiver Program III, but with line 8100 replaced and lines 5900 and 8210 added as follows:

```
5900 RCHECK%=0
8100 IF N>Y THEN RCHECK%=RCHECK%+M(Y):PRINT
    "MESSAGE (";Y;") = ";STORAGE%?Y:
    REM DISPLAY DATA
8210 IF M(N)=RCHECK% MOD 256 THEN PRINT
    "ERROR CHECK O.K." ELSE PRINT
    "TRANSMISSION ERROR DETECTED"
```

In operation an MD correspondence same as TABLE V and an error-checking scheme are set up in both transmitter 21 and receiver 60. The transmitter 21 transmits N-1 message units plus an error-checking message unit, all in the form of respective half cycle duration-coded wavelets. (That means the error-checking message unit is also transmitted as a half cycle wavelet.) Upon reception of the half cycle wavelets the receiver 60 automatically identifies the received error-checking message unit and with reference to which detects the occurrance of transmission error. To show that the present information transmission system with error checking may be embodied with various error-checking schemes a further embodiment employing a different error-checking scheme is described below.

This time the information transmission system with transmission error-checking is achieved, again by coupling transmitter 21 of FIG. 6 to receiver 60 of FIGS. 9 and 11 through a suitable transmission media. But this time transmitter 21 is programmed with Transmitter Program VI and the receiver 60 with Receiver Program VI. Transmitter Program VI is same as Transmitter Program V, but with line 355 modifies as follows:

```
355 IF NUM% MOD 2=1 THEN CHECK%=CHECK%+MESSAGE%
    ELSE CHECK%=CHECK%-MESSAGE%
```

And Receiver Program VI is same as Receiver Program V out with line 8100 modified and lines 8500–8501 added as follows:

```
8100 IF N>Y THEN PRINT
    "MESSAGE (";Y;") = ";STORAGE%?Y:GOSUB 8500
8500 IF Y MOD 2=1 THEN RCHECK%=RCHECK%+M(Y)
    ELSE RCHECK%=RCHECK%-M(Y)
8501 RETURN
```

In this embodiment the transmitter 21 also transmits a number of message units plus an error-checking message unit, all in the form of respective half cycle duration-coded wavelets. However, the error-checking scheme employed is such that the Transmitter 21 (and also the Receiver 60) evauates a CHECKSUM equal to the arithmatic sum of odd message units minus the arithmatic sum of even message units and sets the error-checking message unit to be equal to the remainder of CHECKSUM divided by 256 (i.e. error-checking message unit=CHECKSUM mod 256).

COMPATIBLE INFORMATION TRANSMISSION SYSTEMS

The present invention also provides compatible information transmission systems. As described above the system of the present invention may be embodied to transmit information in the form of half cycle duration-coded waveforms. And in each system the information content of an individual half-cycle wavelet is determined by the specific number of possible different half cycle durations employed in the system. For example, if the number of possible different half cycle durations is 256 then the information content of each transmitted half-cycle wavelet is 1 of 256, i.e. equivalent to 8 bits (1 byte) of information. Similarly, if the number of possible different half cycle durations is 128 then the information content of each transmitted half-cycle wavelet is 1 of 128, i.e. equivalent to 7 bits of information. Furthermore, the specific number of possible different half-cycle durations need not be a multiple of 2, for example it can be 10, or 100 etc. In other words by selecting the number of possible half-cycle durations in a transmission system it is possible to control the amount of information content of the transmitted half-cycle wavelet, i.e. the amount of information represented by each half-cycle wavelet. Hence, in the present invention it is possible to obtain a variety of transmission systems having respectively different information content per half-cycle wavelet.

In addition, the present invention provides compatible information transmission systems which have respectively different amount of information content per half-cycle wavelet. This compatiblity across systems is achieved by representing same message unit with same half-cycle duration, i.e. in the respective MD tables (MD correspondence) of the compatible systems. Accordingly, compatibility between two transmission systems is achieved by employing a specific MD table in one system (for example, the system which has lower information content per wavelet) and a super set MD table in the other (in this case the system which has higher information content per wavelet). And in a similar manner compatibility between several transmission systems is also achieved by employing further respective super sets of MD correspondence. Alternatively, it is also possible to achieve two compatible transmission systems (and similarly more compatible systems) by employing a specific MD table in one system (the one which has higher information content per wavelet) and a sub-set MD table in the other (the system which has lower information content per wavelet). again, in these several compatible systems same message units are represented by same half-cycle durations (i.e. half cycle waves of same duration). As concrete examples several compatible systems are described below wherein the information content per half-cycle wavelet is respectively 1 of 16 (i.e. 4 bits of information), 1 of 64 (6 bits of information), 1 of 128 (7 bits of information), and 1 of 256 (8 bits of information). As mentioned above, same half cycle duration-coded wavelet is arranged to represent same message unit to achieve compatibilty across the several systems. Such manner of MD correspondence is further revealed by the following specific MD tables, namely, TABLE CS16, TABLE CS64, TABLE CS128, and TABLE CS256. And in these several MD tables the half-cycle durations lie within about the same range.

TABLE CS16

| MESSAGE UNIT | DS (microseconds) |
|---|---|
| 0/16 | 1744 |
| 1/16 | 1792 |
| 2/16 | 1840 |
| . | . |
| 14/16 | 2416 |
| 15/16 | 2464 |

TABLE CS64

| MESSAGE UNIT | DS (microseconds) |
|---|---|
| 0/64 | 1744 |
| 1/64 | 1756 |
| 2/64 | 1768 |
| 3/64 | 1780 |
| . | . |
| 62/64 | 2488 |
| 63/64 | 2500 |

TABLE CS128

| MESSAGE UNIT | DS (microseconds) |
|---|---|
| 0/128 | 1744 |
| 1/128 | 1750 |
| 2/128 | 1756 |
| 3/128 | 1762 |
| . | . |
| 125/128 | 2494 |
| 126/128 | 2500 |
| 127/128 | 2506 |

TABLE CS256

| MESSAGE UNIT | DS (microseconds) |
|---|---|
| 0/256 | 1744 |
| 1/256 | 1747 |
| 2/256 | 1750 |
| 3/256 | 1753 |
| . | . |
| 253/256 | 2503 |
| 254/256 | 2506 |
| 255/256 | 2509 |

Referring to the above MD tables note, for example, the half-cycle duration 1936 microseconds reperesents same message unit 4/16, 16/64, 32/128, and 64/256 i.e ¼ across the compatible systems, and similary 1744 microseconds represents 0, and 2128 microseconds represents ½. Hence, by embodying the above respective MD representations specific compatible systems are achieved. Such compatible systems are especially suitable for tranmsimitting magnitude values, measurement values, etc. In particular a system of high information content per wavelet may be chosen for transmitting high accuracy or resolution values, and a system of low information content per wavelet for low accuracy or resolution values. The embodiment of each system is achieved again by coupling transmitter 21 of FIG. 6 to receiver 60 of FIGS. 9 and 11 through a suitable transmission media. This time transmitter 21 may be programmed with Transmitter Program CS256, Transmitter Program CS128 Transmitter Program CS64, or Transmitter Program CS16. Whereas receiver 60 may be programmed with Receiver Program CS256, Receiver Program CS128, Receiver Program CS64, or Reciever Program CS16. Transmitter Program CS256 is same as Transmitter Program III but with lines 120, 150, 200 and 340 changed as follows:

---

120 DLEAST%=1744: REM LEAST HALF-CYCLE
                          DURATION, PROGRAMMABLE
150 FOR M = 0 TO 255
200 DS%=DLEAST%+M*DD%: REM COMPUTE SIGNAL
                          "HALF-CYCLE DURATION"
340 INPUT "*$1/256$",MESSAGE%: PRINT MESSAGE%:
   "*$1/256$": REM INPUT FRACTIONAL VALUES
   (e.g. enter 5 for $5/256$, and 99 for $99/256$ etc.)

---

Transmitter Program CS128 is same as Transmitter Program CS256 but with lines 195 150 180 270 and 340 changed as follows:

---

125 DD%=6: REM DURATION INCREMENT
150 FOR M = 0 TO 127
180 REM (EACH MESSAGE HAS THE SAME INFORMATION CONTENT
   AS 7 BINARY BITS)
270 FOR MESSAGE% = 0 TO 127
340 INPUT "*$1/128$",MESSAGE%: PRINT MESSAGE%;"*$1/128$":
   REM INPUT FRACTIONAL VALUES (e.g. enter 5 for $5/128$,
   and 99 for $99/128$, etc.)

---

Transmitter Program C64 is same as Transmitter Program CS256 but with lines 125, 150, 180, 270, and 340 changed as follows:

---

125 DD%=12: REM DURATION INCREMENT
150 FOR M = 0 TO 63
180 REM (EACH MESSAGE HAS THE SAME INFORMATION CONTENT
   AS 6 BINARY BITS)
270 FOR MESSAGE% = 0 TO 63
340 INPUT "*$1/64$",MESSAGE%: PRINT MESSAGE%;"*$1/64$":
   REM INPUT FRACTIONAL VALUES (e.g. enter 5 for $5/64$,
   and 9 for $9/64$, etc.)

---

Transmitter Program Cs16 is same as Transmitter Program CS256 but with lines 125, 150, 180, 270 and 340 changed as follows:

---

125 DD%=48: REM DURATION INCREMENT
150 FOR M = 0 TO 15
180 REM (EACH MESSAGE HAS THE SAME INFORMATION CONTENT
   AS 4 BINARY BITS)
270 FOR MESSAGE% = 0 TO 15
340 INPUT "*$1/16$",MESSAGE%: PRINT MESSAGE%;"*$1/16$":
   REM INPUT FRACTIONAL VALUES (e.g. enter 5 for $5/16$,
   and 9 for $9/16$, etc.)

---

Receiver Program CS256 is same as Receiver Program III but with lines 5105, 6010, 6030, 8100, 9550, 9555, 9560 changed as follows:

```
5105 STORAGE%=&4800 : REM STORAGE LOCATION
6010 IF DURATION%(Y) < DSB(0) THEN PRINT
     "ERROR IN MESSAGE (";Y;")":
     M(Y)= 127:GOTO 8000
6030 IF DURATION%(Y) < DSB(m) THEN M(Y)=m-1:GOTO 8000
8100 PRINT "MESSAGE (";Y;") = ";STORAGE%?Y;"*1/256":
     REM DISPLAY FRACTIONAL DATA
9550 DLEAST=1744:DD=3
9555 MHZ=4
9560 FOR m=0 To 256:DSB(m)=MHZ*(DLEAST-DD/2+m*DD):NEXT
```

Receiver Program CS128 is same as Receiver Program CS256 but with line 6042 added and lines 6045, 8100, 9550, 9560, and 9820 changed as follows:

```
6042 IF m=129 AND DURATION%(Y) < DSB(129) THEN M(Y)=127:
     GOTO 8000
6045 IF m=130 THEN PRINT "ERROR IN MESSSAGE (";Y;")":
     M(Y)=255:GOTO 8000
8100 PRINT "MESSAGE (";Y;") = ";STORAGE%?Y;"*1/128":
     REM DISPLAY FRACTIONAL DATA
9550 DLEAST=1744:DD=6
9560 FOR m=0 TO 129:DSB(m)=MHZ*(DLEAST-DD/2+m*DD):NEXT
9820 FOR M=0 TO 127
```

Receiver Program CS64 is same as Receiver Program CS256 but with lines 6042, 6045, 8100, 9550, 9560, and 9820 changed as follows:

```
6042 IF m=65 AND DURATION%(Y) < DSB(65) THEN M(Y)=63:
     GOTO 8000
6045 IF m=66 THEN PRINT "ERROR IN MESSSAGE (";Y;")":
     M(Y)=255:GOTO 8000
8100 PRINT "MESSAGE (";Y;") = ";STORAGE%?Y;"*1/64":
     REM DISPLAY FRACTIONAL DATA
9550 DLEAST=1744:DD=12
9560 FOR m=0 TO 65:DSB(m)=MHZ*(DLEAST-DD/2+m*DD):NEXT
9820 FOR M=0 TO 63
```

Receiver Program CS16 is same as Receiver Program CS256 but with lines 6042, 6045, 8100, 9550, 9560 and 9820 changed as follows:

```
6042 IF m=17 AND DURATION%(Y) < DSB(65) THEN M(Y)=15:
     GOTO 8000
6045 IF m=18 THEN PRINT "ERROR IN MESSSAGE (";Y:")":
     M(Y)=255:GOTO 8000
8100 PRINT "MESSAGE (";Y;") = ";STORAGE%?Y;"*1/16":
     REM DISPLAY FRACTIONAL DATA
9550 DLEAST=1744:DD=48
9560 FOR m=0 TO 17:DSB(m)=MHZ*(DLEAST-DD/2+m*DD):NEXT
9820 FOR M=0 TO 15
```

In operation the above programs respectively establish in the transmitter 21 of FIG. 6 or in the receiver 60 of 9 a message unit half-cycle duration correspondence as shown in one of the above MD tables to produce compatible transmitters and receivers. Transmitters and receivers which embody high information content per half-cycle wavelet, e.g. as achieved with TABLE CS256 have the advantages of high content information transmission and are suitable for the transmission of high resolution data, while those which embody low information content per half-cycle wavelet, e.g. as achieved with TABLE CS16 are suitable for the transmission of low resolution data and have the advantage of being more robust as a transmission system, i.e. less sensitive to transmission imperfections, such as distortion, noise, shift or jitter, or wow and flutter of a recorder, etc. And it is workable in the present invention to couple transmitters that embodies high information content per wavelet to receivers that embodies low information content per wavelet, or vice versa.

Figure 15:
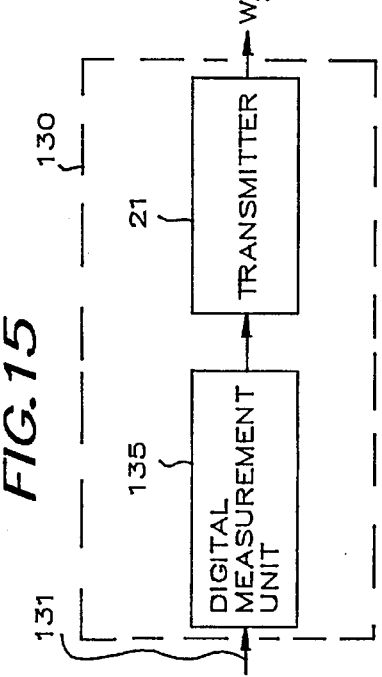
FIG. 15 is a block diagram of a measurement equipment employing a transmitter system constructed in accordance with the principles of the present invention.

The transmission system may also be practiced in yet another manner, for example as shown in FIG. 15, to transmit measurement information. In FIG. 15 there is shown a measurement equipment 130 which is constructed to output and transmit measurement data in the form of half-cycle duration-coded wavelets 132, such as those waveforms shown in FIG. 1, achieved by coupling a digital measurement device 135 to transmitter 21. In operation, the device measures a specific physical quantity and consequently provides corresponding digital outputs. These outputs are fed to transmitter 21 as input message units, which are subsequently converted into and transmitted through a transmission media as half-cycle duration-coded wavelets according to the established MD correspondence in transmitter 21. Such a measurement equipment 130 is useful in measurements and recording of physical quantities and also in telemetry and monitoring systems since the output waveforms at output 132 may be transmitted through a transmission media or recorded as wavelengths on a recording medium and may be recovered back to the origin data (message units) by a receiver 60. Since the measurement equipment is embodied with transmitter 21 it outputs high information content half-cycle wavelets (i.e. equivalent to many bits, for example, eight bits of information per wavelet). Consequently, the present invention has many advantages. Some of these advantages are described below. Comparing the present system with alternative serial binary bit by bit transmission of the same amount of information, say, eight bits, which has an individual bit cell duration of the same half-cycle wavelet duration, such as DS(1) of FIG. 1, the present system permits faster transmission of meaurement data (information), e.g. eight times faster because a single half-cycle contains eight bits of information. On the other hand, comparing the present system with alternative serial binary bit by bit "on" "off" transmission (e.g. binary two level transmission similar to RS232 transmission) at same rate of information transmission, say, transmitting eight individual binary "on" or "off" bits in the same time span as a half-cycle wavelet duration of the present system, such as DS(1) of FIG. 1, the present system requires narrower bandwidth, e.g. ⅛ the bandwidth required for serial bit by bit transmission. Furthermore, comparing the transmitted half-cycle wavelet of the present system with alternative serial binary bit by bit transmission of same amount of information transmission, say, eight binary bits the present system requires fewer waveform transitions, e.g. up to eight times fewer waveform transitions.

A/D Transmitter

Referring to FIG. 15 agian a more specific version of the measurement equipment 130 is described below to further explain the present invention. The measurement equipment 130 is constructed as a specific electrical voltage measurement equipment. In this case the electrical voltage measurement equipment (measurement equipment 130) measures the electrical voltage at the input 131 and outputs the measurements in the form of half-cycle duration-coded wavelets 132. It is realized by employing an analog-to-digital converter as the digital measurement device 135 of FIG. 15, which is coupled to and at the front end of the transmitter 21. In the current example it measures D.C. voltages (which, of course, may be the electrical analog of yet other specific physical quantities), in a magnitude range of between 0 V to 1.8 V corresponding to 256 voltage steps or levels. The message unit to half-cycle cycle duration representation (correspondence) is illustrated by the following MD table, TABLE AD1.

TABLE AD1

| MESSAGE UNIT (volts) | HALF-CYCLE DURATION (microseconds) |
|---|---|
| 0 | 2509 |
| $1*1.8/256$ | 2506 |
| $2*1.8/256$ | 2503 |
| $3*1.8/256$ | 2500 |
| . | . |
| . | . |
| . | . |
| etc. | |

In TABLE AD1 each message unit is one of 256 voltage levels uniformly spaced in a range of 0 V to 1.8 V. (In alternative embodiments the message units may be non-uniformly spaced voltage levels, for example voltage levels with smaller spacing towards one end of the range to provide fine resolution and wider spacing towards the other end to provide a wide dynamic range.) This voltage measurement equipment has been constructed and successfully operated by coupling a PD7002 (A/D converter chip) which is already provided in the BBC Microcomputer Model B to the transmitter 21 embodied with the same Microcomputer. In operation the electrical voltage or electrical analog being measured is input (i.e. sampled) at an analog input channel (e.g., channel 1) of the PD7002 chip. The microcomputer 22 of the transmitter 21 has been additionally programmed to take the outputs from the PD7002 A/D converter as specific message units. In other words, the sampled voltages are respectively fed to transmitter 21 as message units. Then the microcomputer 22 of the transmitter 21 operates in the same general manner as described in the earlier embodiements; the transmitter receives the input message units, and subsequently converts and transmits them as half-cycle duration-coded wavelets at output 132. In summary the A/D converter measures or samples analog voltages, converts them to digital values (voltage steps) and the transmitter 21 transmits these digital value (voltage steps) as message units in the form of half-cycle duration-coded wavelets. A suitable program for the microcomputer 22 to accomplish the operations described is Transmitter Program AD. Transmitter Program AD is the same as Transmitter Program III but with lines 325, 335, and 336 inserted and lines 300 and 340 changed as follows:

```
300 N=129: REM TAKE N MEASUREMENTS WITH A/D CONVERTER,
            CHANNEL 1
            (N=1, 11, 129, ETC., PROGRAMMABLE)
325 NOWTIME = TIME
335 REM 0 <=AD_VOLTSTEP <= 1.8 volts
336 REPEAT UNTIL TIME = NOWTIME + 100:
    REM TAKE ADC MEASUREMENTS AT 1 SECOND INTERVALS
340 NOWTIME = NOWTIME + 100:
    AD_VOLTSTEP% = INT ADVAL(1)/256:
    MESSAGE% = AD_VOLTSTEP%
```

In this specific example, the measurement equipment 130 functions as a digital voltmeter. When voltage values of, say, 1.50 V, 1.31 V, 1.19 V, . . . , etc., are respectively measured (sampled) the equipment takes the respective measured values as message units, which are subsequently converted and transmitted (i.e. output) as individual half-cycle duration-coded wavelets of 1870 microseconds, 1951 microcoseconds, 2002 microseconds, ..., etc., for example in the form of half cycles WS(1), WS(2), ..., etc. as shown in FIG. 1, in the general manner described earlier and in accordance with the message unit to half-cycle duration correspondence (MD table) there set out. It is understood that other A/D converters, voltage dividers, etc. may be employed in the equipment for measuring other voltage ranges. From the several embodiments described, it is clear that the transmitter of the present invention may be practiced in and coupled to various systems and equipments, such as telemetry systems, thermometers, pressure meters, etc., for output transmission. Again, since the measurement equipment is embodied with transmitter 21 it outputs high information content half-cycle wavelets (i.e. many bits per wavelet instead of binary bit by bit output), and consequently, it permits faster transmission or requires a smaller bandwidth or fewer waveform transitions compared to serial binary bit by bit transmissions.

The receiver 60 of FIG. 9 is employed to receive the transmitted wavelets from measurement equipment 130 output at 132. In this case the receiver 60 is programmed with Receiver Program AD1. Receiver Program AD1 is same as Receiver Program III but with line 8100 changed as follows:

```
8100 PRINT "VOLTAGE MEASURED = AD_VOLTSTEP ";
    STORAGE%?Y;" , i.e. = ";STORAGE%?Y;
    "*1.8/256 volts = ";STORAGE%?Y*1.8/256;
    " volts":
    REM DISPLAY VOLTAGE MEASURED
```

Of course, the measurement output from measurement equipment 130 may also be recorded by feeding the output wavelets at 132 to a record/playback unit 90 as shown in FIG. 13 to provide a permanent record in the form of recorded half wavelengths on a recording medium, such as a magnetic recording track, and subsequently retrieved by feeding the playback waveforms output from the record/playback unit 90 to the receiver 60.

Transducer transmitter

Figure 16:
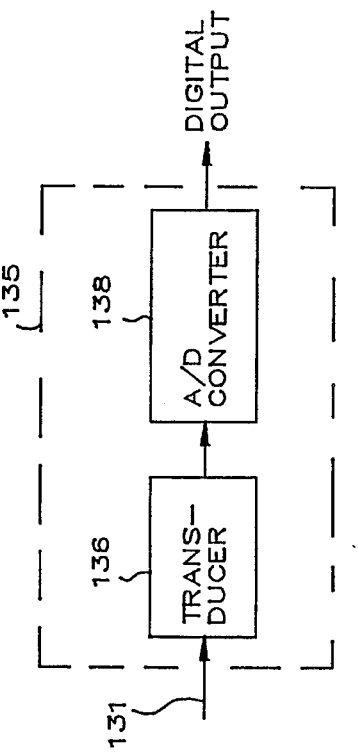
FIG. 16 is a block diagram of a digital measuring device constructed in accordance with the principles of the present invention.

The following description reveals yet another example of the measurement equipment 130 of FIG. 15. The measurement equipment 130 is constructed to measure a specific physical quantity other than electrical voltage. In this case the measurement equipment 130 measures a speicific physical quantity at the input 131 and outputs the measurements in the form of half-cycle duration-coded wavelets 132. It is realized by employing a digital measurement device 135 as shown in FIG. 16, consisting of a specific transducer 136, such as a pressure tranducer, temperature transducer, position transducer, light senser, etc., depending of the intended application, which is coupled to an analog-to-digital converter 138. In operation the "value" of the specific physical quantity being measured by transducer 136 at input 131 is converted to an electrical analog at the output of the transducer and fed to the input of the analog-to-digital converter 138, and subsequently converted by the analog-to-digital converter into a digital output. The transmitter 21 takes this digital output as an input message unit and transmits at output 132 a half-cycle duration-coded wavelet according to the message unit to half-cycle duration representation (MD table) there set out. Again, individual measurements (sampled values) at input 131 are transmitted at output 132 as half cycles, for example in the form of half cycles WS(1), WS(2), ..., etc. as shown in FIG. 1, in the general manner described earlier.

From the foregoing description, it will be apparent that the system of the present invention provides a method and system for communication which has advantages over the prior art While several embodiments of the system of the invention have been shown and described, changes and modifications may be made to the system without departing from the teaching of the invention and, therefore, the invention is only to be limited as necessitated by the accompanying claims.

I claim:

1. A process for transmitting information comprising a series of message units selected from a set of more than two defined message units, said transmission process comprising the steps of:
    (a) defining the message units comprising said set of defined message units:
    (b) assigning a wavelet duration to each defined message unit:
    (c) converting each of said defined message unit of the information to be transmitted into an alternate-state wavelet at a rate of one message unit per wavelet state, each of said defined message unit being a member of said set of defined message units, the duration of said alternate-state wavelet being varied for each of said defined message unit to conform to the wavelet duration defined for each of said defined messsage unit, successive converted wavelets corresponding to respective message units being contiguous and alternating:
    (d) transmitting said converted wavelet, said information to be transmitted being transmitted as succeeding alternating wavelets:
    (e) receiving said transmitted wavelet;
    (f) determining a received wavelet duration of said received wavelet;
    (g) deconverting said received wavelet duration to a message unit in accordance with the assigned wavelet duration, thereby to convey the information.

2. The process of claim 1 wherein each of said defined message unit consists of a plurality of binary bits.

3. The process of claim 1 wherein each of said defined message unit consists of a plurality of binary bits, said plurality may be varied for each of said defined message unit.

4. A signal transmitter for transmitting a message comprising a series of specific message units taken from a set of more than two possible message units, said transmitter comprising:
    (a) means for defining each member of the set of possible message units as a wavelet duration;
    (b) means coupled to said defining means for receiving the series of specific message units, and for sequentially determining the wavelet duration defined for each successive specific message unit of the message;
    (c) means coupled to said receiving and determining means for generating for each message unit an alternate-state wavelet having a wavelet duration at a rate of one message unit per wavelet state, said wavelet duration being the wavelet duration having a varied duration, successive generated wavelets corresponding to respective message units being contiguous and alternating;
    (d) output means for coupling said generated wavelet to transmission means, such as a transmission line or a broadcast radio transmitter or an optical fiber or an optical transmitter or a magnetic recording track or an optical recording track or recording media or transmission media.

5. The signal transmitter of claim 4 wherein said each successive specific message unit of the message consists of a plurality of binary bits.

6. The signal transmitter of claim 4 wherein said successive generating wavelets consist of two waveform levels.

7. A transmitter receiver apparatus comprising transmitter means for transmitting signals and receiver means for receiving said signals, said transmitter means comprising the signal transmitter for transmitting a message comprising a series of specific message units taken from a set of more than two possible message units, said transmitter comprising:

(a) means for defining each member of the set of possible message unit as a wavelet duration;

(b) means coupled to said defining means for receiving the series of specific message units, and for sequentially determining the wavelet duration defined for each successive specific message unit of the message;

(c) means coupled to said receiving and determining means for generating for each message unit an alternate-state wavelet having a wavelet duration at a rate of one message unit per wavelet state, said wavelet duration being the wavelet duration having a varied duration, successive generated wavelets corresponding to respective message units being contiguous and alternating;

(d) output means for coupling said generated wavelet to transmission means, such as a transmission line or a broadcast radio transmitter or an optical fiber or an optical transmitter or a magnetic recording track or an optical recording track or recording media or transmission media as defined in claim 4 for generating said signals.

8. A signal receiver for receiving and decoding alternating one-of-two-state wavelets, comprising:

(a) an input means for receiving said alternating one-of-two-state wavelets;

(b) means for defining each member of a set of more than two message units as a different wavelet duration;

(c) means intercoupled with said defining means and said input means for determining and decoding the duration of each wavelet state of a received succession of continuous and alternating wavelet states to obtain a corresponding succession of message units at a rate of one message unit per contiguous wavelet state according to said defining means.

9. A process for encoding and decoding comprising: a conversion step for converting a multibit pattern to an alternate one-of-two-state wavelet at a rate of one said multibit pattern per wavelet state, successive converted wavelets corresponding to respective multibit patterns being contiguous and alternating and a deconversion step for deconverting said alternate one-of-two-state wavelet to a bit pattern substantially same as said multibit pattern, whereby achieving multibit encoding and decoding in the form of a high information content said alternate one-of-two-state wavelet.

10. The process for encoding and decoding comprising a conversion step for converting a multibit pattern to an alternate one-of-two-state wavelet at a rate of one said multibit pattern per wavelet state, successive converted wavelets corresponding to respective multibit patterns being contiguous and alternating and a deconversion step for deconverting said alternate one-of-two-state wavelet to a bit pattern substantially same as said multitbit pattern, as defined in claim 9, said process comprising steps of:

(a) reading said a multitbit pattern;

(b) converting said read pattern to said an alternate one-of-two-state wavelet, successive wavelets being alternating;

(c) transmitting said converted wavelet;

(d) receiving said transmitted wavelet;

(e) deconverting said received wavelet to said a bit pattern substantially same as said multitbit pattern, whereby achieving said multitbit encoding and decoding in the form of said high information content alternate one-of-the-two-state wavelet.

11. The process for encoding and decoding as defined in claim 9 wherein said deconverted bit pattern of said deconverting step being identical to said converted multitbit pattern of said converting step.

12. An apparatus comprising:

(a) reading means for reading a multitbit pattern;

(b) converting means for converting said multitbit pattern to an alternate one-of-two-state wavelet at a rate of one said multitbit pattern per wavelet state, successive converted wavelets corresponding to respective multitbit patterns being continuous and alternating, whereby multitbit encoding in the form of a high information content one-of-two-state wavelet may be achieved.

13. The apparatus of claim 12 further comprising deconverting means for deconverting said converted wavelet to a deconverted bit pattern substantially same as said converted multitbit pattern.

14. The apparatus of claim 12 wherein said converting means being capable of converting at a rate of one byte pattern per said wavelet state.

15. The apparatus of claim 12 further comprising means for converting the analog magnitude of an input to said multitbit pattern to be read by said reading means.

16. An apparatus comprising:

(a) an input means for receiving encoded alternate one-of-two-state wavelets containing multitbit information per wavelet state;

(b) means for defining each member of a set of multitbit patterns respectively as a different wavelet duration;

(c) means intercoupled with said defining means and said input means for determining and decoding the duration of each wavelet state of a received succession of contiguous and alternating wavelet states to obtain a corresponding succession of multitbit patterns at a rate of one multitbit pattern per contiguous wavelet state according to said defining means, said corresponding succession of multitbit patterns being substantially same as the original respective multitbit patterns encoded therein.

17. An apparatus comprising:

(a) reading means for reading a bit pattern;

(b) converting means for converting said bit pattern to an alternate one of two state wavelet at a rate of one said bit pattern per wavelet state, successive converted wavelets corresponding to respective bit patterns being contiguous and alternating, said converting means comprising means for converting bit patterns each comprising at least eight bits, whereby multitbit encoding in the form of a high information content one-of-two-state wavelet may be achieved.

18. An apparatus comprising:

(a) reading means for reading a bit pattern;

(b) converting means for converting said bit pattern to an alternate one-of-two-state wavelet at a rate of one said bit pattern per wavelet state, successive converted wavelets corresponding to respective bit patterns being contiguous and alternating, said converting means comprising means for converting a plurality of said bit patterns associated with increasing magnitudes, respectively, to individual one-of-two-state wavelets of increasing time durations, whereby multibit encoding in the form of a high information content one-of-two-state wavelet may be achieved.

19. An apparatus comprising:

(a) reading means for reading a bit pattern;

(b) converting means for converting said bit pattern to an alternate one-of-two-state wavelet at a rate of one said bit pattern per wavelet state, successive converted wavelets corresponding to respective bit patterns being contiguous and alternating, said converting means comprising means for converting a plurality of said bit patterns associated with increasing magnitudes, respectively, to individual one-of-two-state wavelets of decreasing time durations, whereby multibit encoding in the form of a high information content one-of-two-state wavelet may be achieved.

20. An apparatus comprising:

(a) reading means for reading a bit pattern;

(b) converting means for converting said bit pattern to an alternate one-of-two-state wavelet at a rate of one said bit pattern per wavelet state, successive converted wavelets corresponding to respective bit patterns being contiguous and alternating, said converting means comprising means for converting a plurality of said bit patterns each comprising a different number of bits to individual one-of-two-state wavelets having same wavelet duration if said plurality of bit patterns represent same magnitude, whereby multibit encoding in the form of a high information content one-of-two-state wavelet may be achieved.

* * * * *